(12) United States Patent
Oteri et al.

(10) Patent No.: US 11,943,699 B2
(45) Date of Patent: Mar. 26, 2024

(54) SYSTEM AND METHOD FOR DETERMINING PDCCH MONITORING CAPABILITY PER COMPONENT CARRIERS IN A CARRIER AGGREGATION FOR SPAN BASED PDCCH MONITORING

(71) Applicant: Apple Inc., Cupertino, CA (US)

(72) Inventors: Oghenekome Oteri, San Diego, CA (US); Chunxuan Ye, San Diego, CA (US); Dawei Zhang, Saratoga, CA (US); Haitong Sun, Cupertino, CA (US); Hong He, San Jose, CA (US); Wei Zeng, Saratoga, CA (US); Weidong Yang, San Diego, CA (US); Yushu Zhang, Beijing (CN); Sigen Ye, Whitehouse Station, NJ (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,170

(22) PCT Filed: Apr. 8, 2020

(86) PCT No.: PCT/CN2020/083696
§ 371 (c)(1),
(2) Date: Sep. 20, 2021

(87) PCT Pub. No.: WO2021/203276
PCT Pub. Date: Oct. 14, 2021

(65) Prior Publication Data
US 2023/0033872 A1    Feb. 2, 2023

(51) Int. Cl.
*H04W 48/12*    (2009.01)
*H04L 5/00*    (2006.01)

(52) U.S. Cl.
CPC ............. *H04W 48/12* (2013.01); *H04L 5/001* (2013.01); *H04L 5/0053* (2013.01)

(58) Field of Classification Search
None
See application file for complete search history.

(56) References Cited

U.S. PATENT DOCUMENTS

2018/0279297 A1    9/2018  Nogami
2020/0329389 A1*   10/2020 Hosseini ............... H04L 5/0053
2022/0338039 A1*   10/2022 Takahashi ............. H04W 72/23

FOREIGN PATENT DOCUMENTS

CN    110612690 A    12/2019
CN    110620645 A    12/2019

OTHER PUBLICATIONS

Catt, "Remaining issues on PDCCH enhancements," 3GPP TSG RAN WG1 Meeting #100 R1-2000527, Feb. 28, 2020 (Feb. 28, 2020).

(Continued)

*Primary Examiner* — Hong S Cho
(74) *Attorney, Agent, or Firm* — Blank Rome LLP

(57) ABSTRACT

An example method for wireless communication includes: configuring a wireless device to access a wireless network using a set of at least three components carriers (CCs); dividing the at least three component carriers into groups of component carriers based on whether the component carriers share a span pattern and a starting span for monitoring a Physical Downlink Control Channel (PDCCH) of each component carrier; determining a number of non-overlapping control channel elements (CCE) to monitor for each group of component carriers; and configuring the wireless device to monitor the non-overlapping CCEs based on the determined number to monitor for each group.

20 Claims, 15 Drawing Sheets

(56) References Cited

OTHER PUBLICATIONS

Ericsson, "Remaining Issue of PDCCH Enhancements for NR URLLC," 3GPP TSG-RAN WG1 Meeting #100-e R1-2000230, Mar. 6, 2020 (Mar. 6, 2020).
Ghosh, Amitabha, "5G New Radio (NR): Physical Layer Overview and Performance," IEEE Communication Theory Workshop—2018, May 15, 2018.
Huawei, "Summary of email discussion [100e-NR-L1enh_URLLC_PDCCH-03] on remaining issues on enhanced PDCCH monitoring capability," 3GPP TSG RAN WG1 Meeting #100-e R1-2001409, Mar. 6, 2020 (Mar. 6, 2020).
Huawei, et al., "Email discussion/approval on remaining issues on enhanced PDCCH monitoring capability," 3GPP TSG RAN WG1 Meeting #100-e R1-2xxxxx, Feb. 28, 2020 (Feb. 28, 2020).
Intel Corporation, "Remaining aspects on Rel-16 PDCCH enhancements for URLLC," 3GPP TSG RAN WG1 #100-E R1-2000735, Mar. 6, 2020 (Mar. 6, 2020).
Samsung, "Corrections on Ultra Reliable Low Latency Communications Enhancements," 3GPP TSG-RAN WG1 Meeting #100-e R1-2001460, Mar. 6, 2020 (Mar. 6, 2020).
Qualcomm, "Remaining Issues on PDCCH Enhancements for URLLC," 3GPP Draft, R1-2000968, 3rd Generation Partnership Project (3GPP), vol. RAN WG1, No. eMeeting, Feb. 24-Mar. 6, 2020, Feb. 15, 2020 (Feb. 15, 2020), XP051853542.

\* cited by examiner

SYSTEM AND METHOD FOR DETERMINING PDCCH MONITORING CAPABILITY PER COMPONENT CARRIERS IN A CARRIER AGGREGATION FOR SPAN BASED PDCCH MONITORING

FIELD

The present application relates to wireless devices, and more particularly to apparatus, systems, and methods for determining Physical Downlink Control Channel (PDCCH) monitoring capability in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for determining PDCCH monitoring capability per component carriers in a carrier aggregation for span based PDCCH monitoring.

In certain cases, a User Equipment (UE) has a limited ability to monitor for PDCCH messages. When the UE is configured to utilize multiple component carriers (CCs, sometimes also referred to as "cells"), such as in a carrier aggregation scenario, the UE may need to monitor for PDCCH across the multiple carriers. In certain cases, the PDCCH monitoring space can exceed the monitoring capability of the UE. In certain cases, the UE may indicate, for example, to a network element, a maximum PDCCH monitoring capability of the UE. A PDCCH monitoring capability per component carrier may be determined to help scale the complexity limit per component carrier to help reduce the dimensions or space that the UE needs to monitor.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
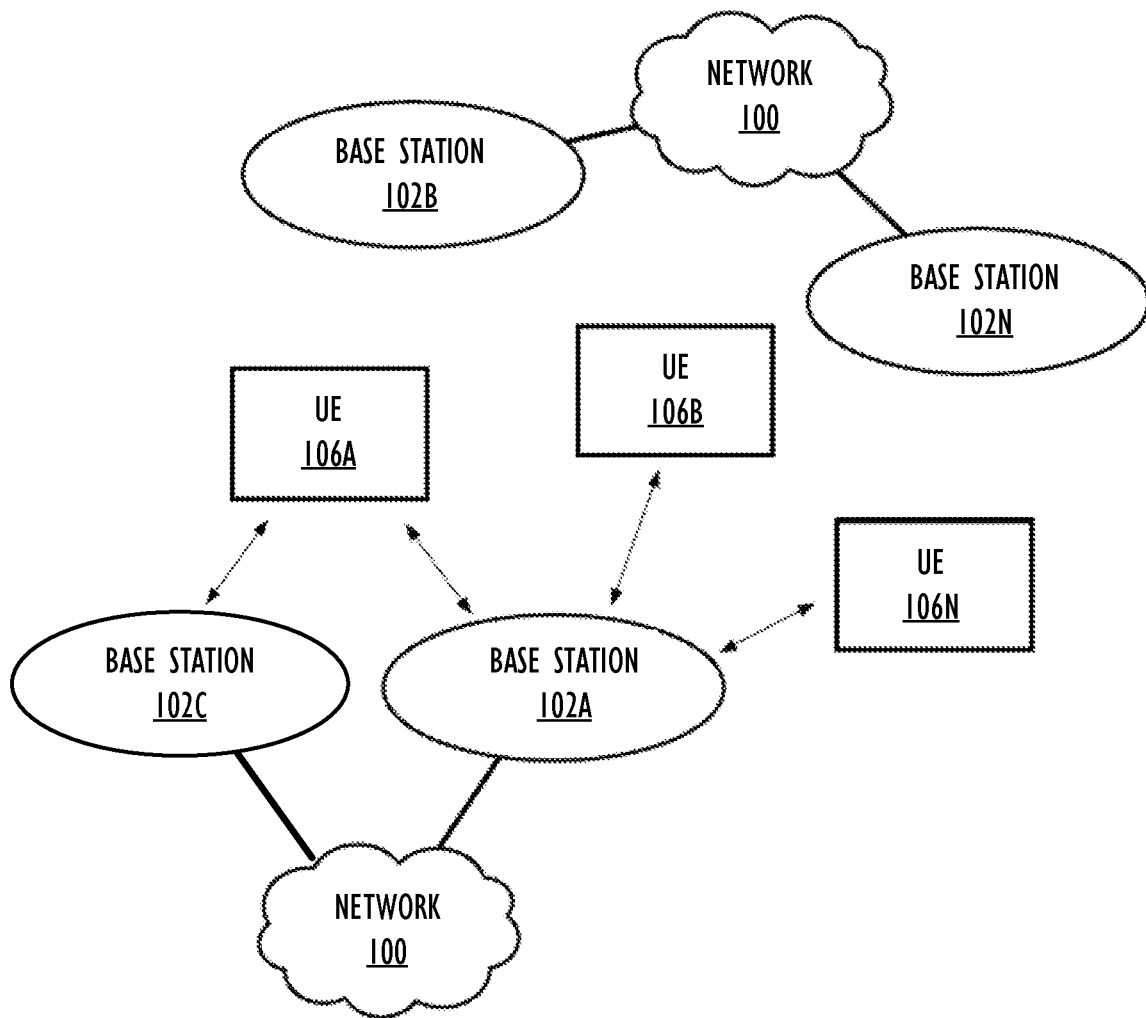
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications scenarios, component carriers may be associated with a specific PDCCH span pattern and starting span. Monitoring for a PDCCH message on a component carrier occurs on a defined schedule. For example, PDCCH monitoring occasions may be based on a span pattern for a particular time interval. As a more detailed example, an orthogonal frequency-division modulation (OFDM) frame may be divided into a set of spans of a set number of consecutive OFDM symbols. The PDCCH span pattern may then be defined for a set number and location of spans for each set of spans. For example, a PDCCH span pattern may be in a form of (X,Y), where X represents a gap between a first span of a PDCCH monitoring occasion and another PDCCH monitoring occasion, and Y represents a number of spans to monitoring for the PDCCH monitoring occasion. Thus, a PDCCH span pattern of (4,3), e.g., would indicate that the PDCCH monitoring occasion will last for three spans, with no monitoring in a fourth span. This span pattern then repeats for the set of spans. In addition to the span pattern, a starting span indicates in which span, of the set of spans, a particular span pattern starts.

Components carriers may thus be categorized as "aligned" or "unaligned." For two or more component carriers to be aligned, the component carriers have the same span pattern and starting span. Component carriers with different span patterns or different starting spans are unaligned. It may be understood that, in the carrier alignment context, the component carriers implement at least a common time interval. For example, where a UE is configured with a mix of common carriers, a first set of which having OFDM frames divided into a set of spans, such as fourteen spans, and a second set of which have OFDM frames divided into two slots per frame, whether a set of component carriers are aligned or not would not refer to whether a first component carrier from the first set is aligned or not aligned with a second component carrier from the second set.

In accordance with aspects of the present disclosure, different techniques for allocating the PDCCH monitoring ability of a UE may be implemented based on component carrier alignment. There are three basic scenarios for component carrier alignment. The first scenario is that all of the component carriers are aligned. The second scenario is that some of the component carriers are not aligned. The first scenario applies if, for any span that starts from a symbol on a downlink component carrier from the $N_{cells,r16}^{DL,(X,Y),\mu}$ downlink component carriers, there is a span on every other downlink component carrier from the $N_{cells,r16}^{DL,(X,Y),\mu}$ downlink component carriers that starts from the symbol. (Note: μ, in this context, simply refers to an index into possible SCS configurations, e.g., 30 kHz, 60 kHz, ... 240 kHz, in the cases of Rel-15 and Rel-16.) The number of serving component carriers configured with a common time interval, such as a set of spans (e.g., in Rel-16), PDCCH monitoring capability with an associated PDCCH span pattern (X, Y) with a common subcarrier spacing (SCS) may be referred to as $N_{cells,r16}^{DL,(X,Y),\mu}$. In certain cases, a UE may have a maximum capability to monitor PDCCH for a particular span patterns (X, Y), represented by $C_{PDCCH}^{max,(X,Y),\mu}$, if the UE indicates a capability to monitor PDCCH according to multiple (X, Y) combinations and a configuration of search space sets to the UE results in a separation of any two consecutive PDCCH monitoring spans that is equal to or larger than the value of X for two or more of the (X, Y) combinations. If a UE is configured with $N_{cells,r16}^{DL,(X,Y),\mu}$ downlink component carriers with an combination (X, Y) and SCS configuration μ, and where $\Sigma_{\mu=0}^{1}=N_{cells,r16}^{DL,\mu}>N_{cells}^{cap-r16}$, the UE is not required to monitor more than $C_{PDCCH}^{total,(X,Y),\mu}$ non-overlapping control channel elements (CCEs) per span on the active downlink bandwidth parts (BWPs) of the scheduling component carriers from the $N_{cells,r16}^{DL,(X,Y),\mu}$ downlink component carriers. In this aligned case, the total number of non-overlapping CCEs per span to be monitored is given by Equation 1, $C_{PDCCH}^{total,(X,Y),\mu}=\lfloor N_{cells}^{cap-r16} \cdot C_{PDCCH}^{max,(X,Y),\mu} \cdot (N_{cells,r16}^{DL,(X,Y),\mu})/\Sigma_{j=0}^{1}=(N_{cells,r16}^{D,j})\rfloor$. Here, $N_{cells}^{cap-r16}$ resents the UE's capability on the number of CCs/cells, with Rel-16 PDCCH monitoring capability.

In the aforementioned second scenario, at least two component carriers are non-aligned. That is, the second scenario applies if, for any span that starts from a symbol on a downlink component carrier from the $N_{cells,r16}^{DL,(X,Y),\mu}$ downlink component carriers, all of the spans on at least one other downlink component carrier from the $N_{cells,r16}^{DL,(X,Y),\mu}$ downlink component carriers do not start from the same symbol. If a UE is configured with $N_{cells,r16}^{DL,(X,Y),\mu}$ downlink component carriers with an combination (X, Y) and SCS configuration μ, and where $\Sigma_{\mu=0}^{1} N_{cells,r16}^{DL,\mu}>N_{cells}^{cap-r16}$, the UE is not required to monitor more than $C_{PDCCH}^{total,(X,Y),\mu}$ non-overlapping control channel elements for any set of spans across the active Downlink Bandwidth Parts (DL BWPs) of scheduling of the scheduling component carriers from the $N_{cells,r16}^{DL,(X,Y),\mu}$ downlink component carriers if the spans on different downlink component carriers from the $N_{cells,r16}^{DL,(X,Y),\mu}$ downlink component carriers are not aligned, with at most one span per scheduling component carrier for each set. In this non-aligned case, the total number of non-overlapping CCEs per span to be monitored may also be defined by Equation 1, $C_{PDCCH}^{total,(X,Y),\mu}=\lfloor N_{cells}^{cap-r16} \cdot C_{PDCCH}^{max,(X,Y),\mu} \cdot (N_{cells,r16}^{DL,(X,Y),\mu})/\Sigma_{j=0}^{1}(N_{cells,r16}^{DL,j})\rfloor$, where j is an index into the available subcarrier spacing configurations (e.g., only 30 kHz and 60 kHz are considered in this example).

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect.

Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
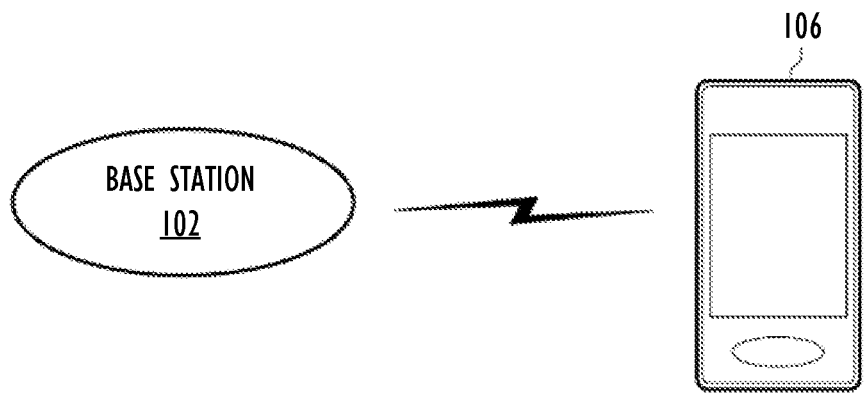
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
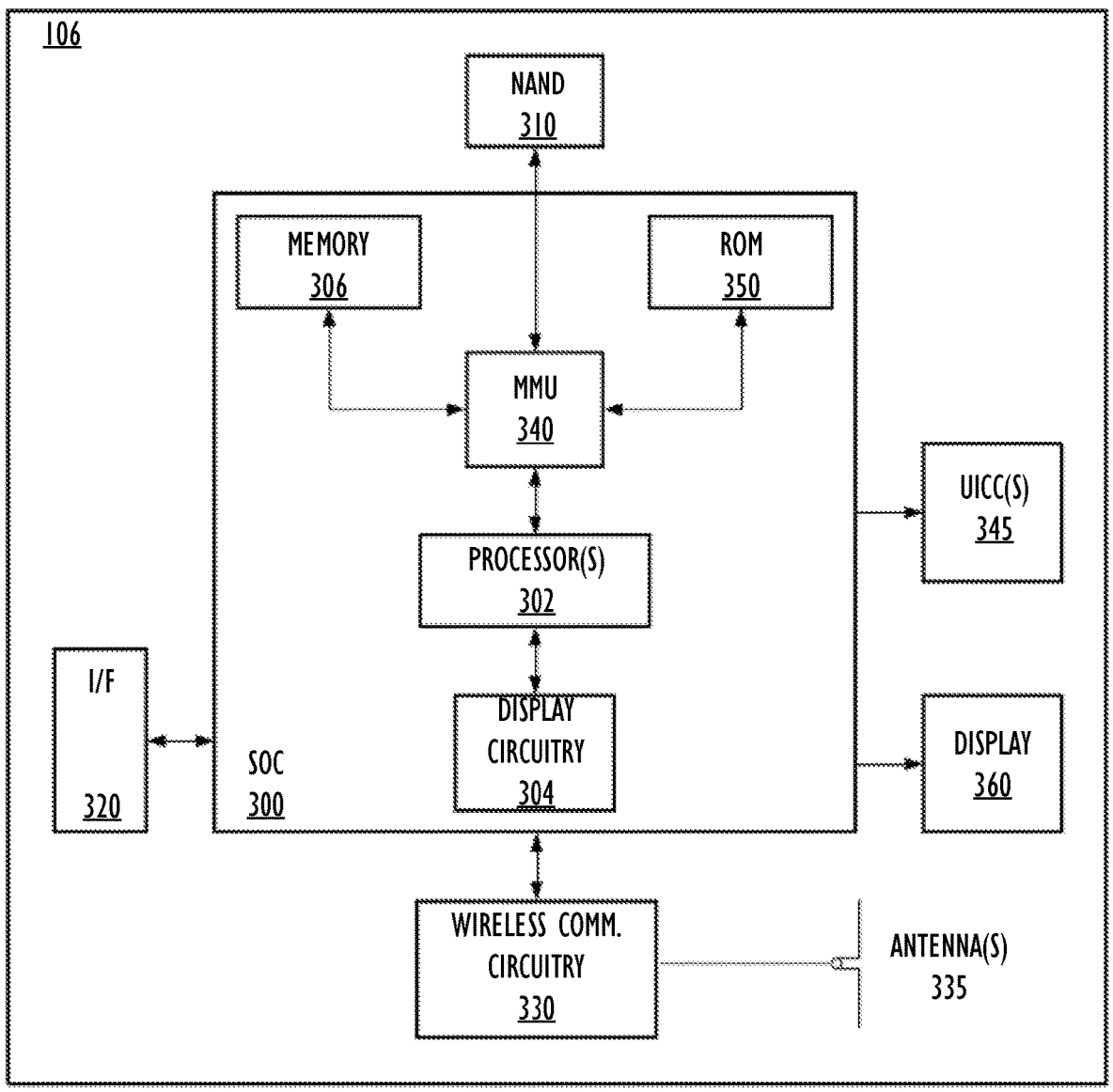
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
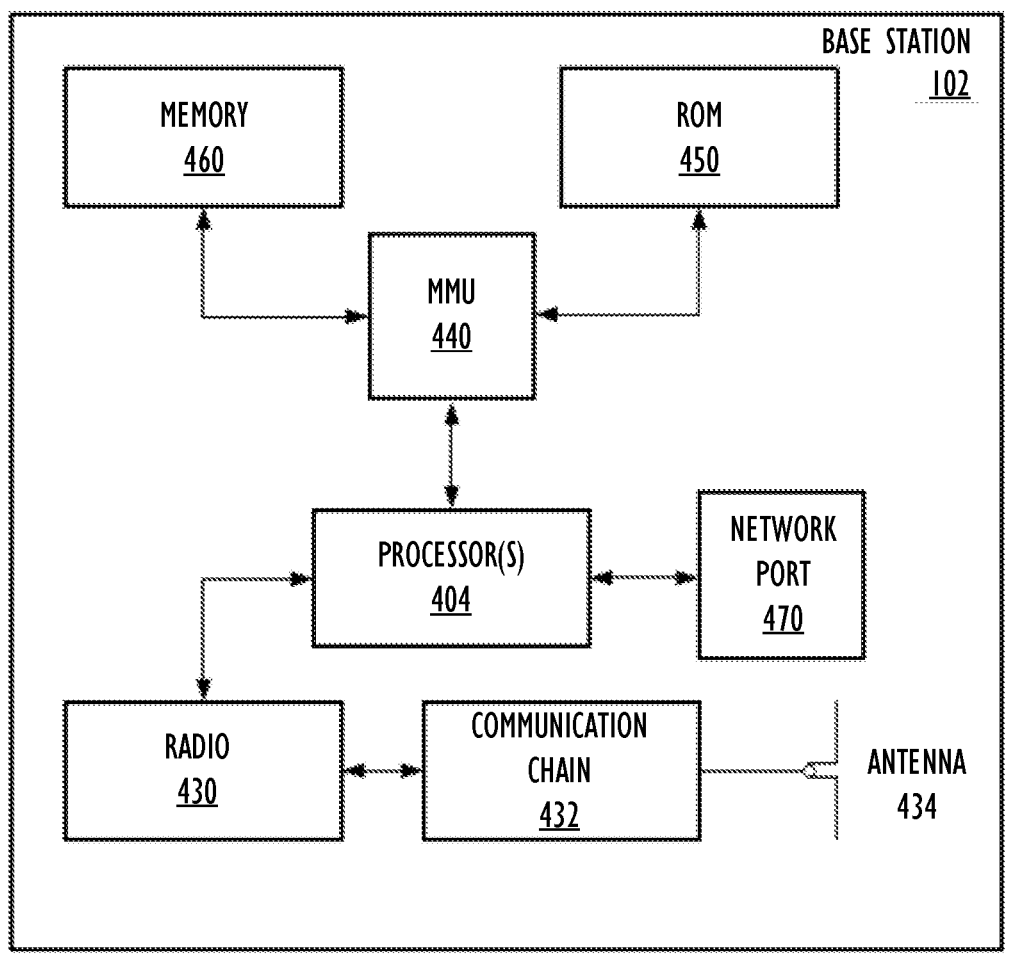
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
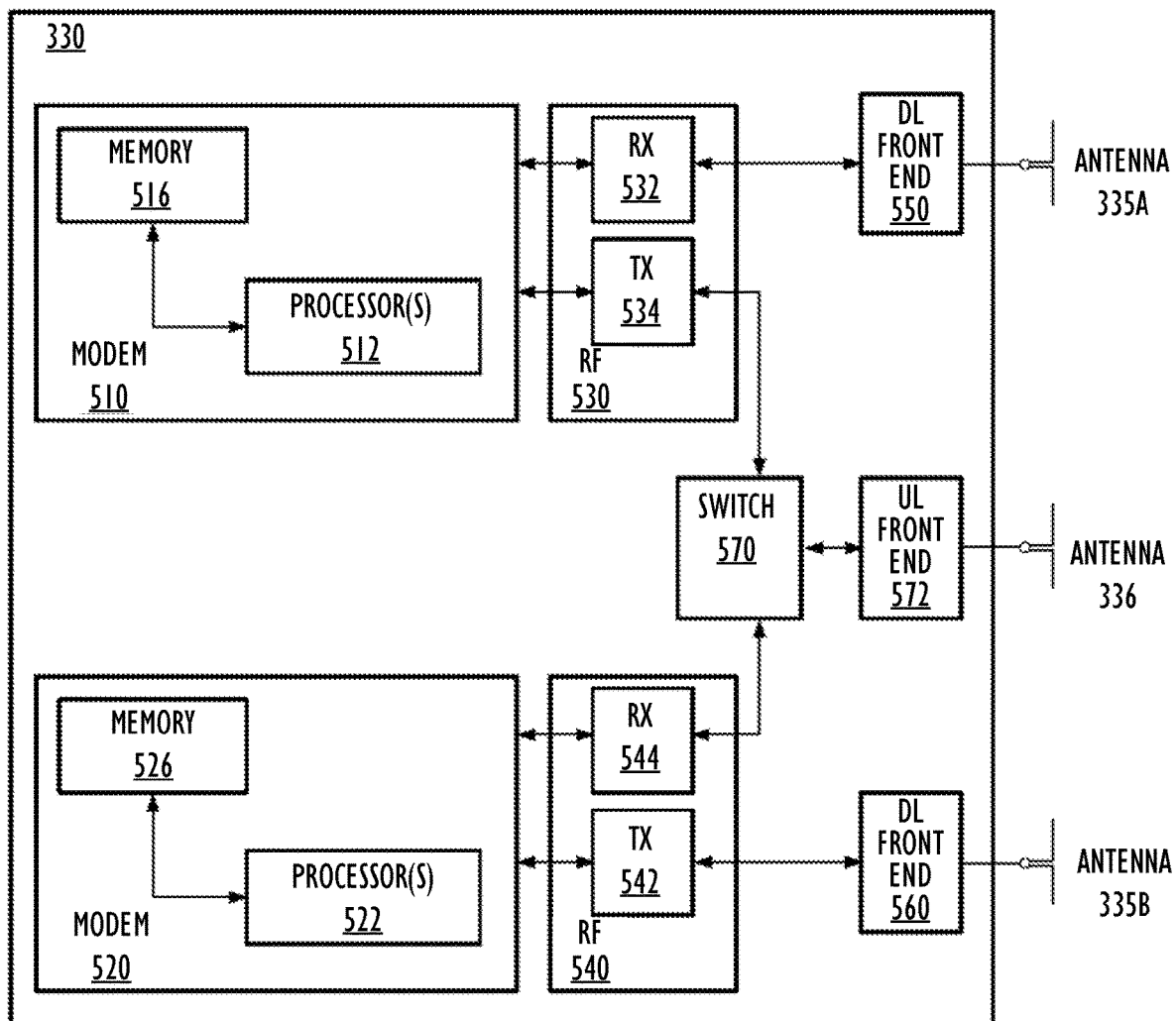
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
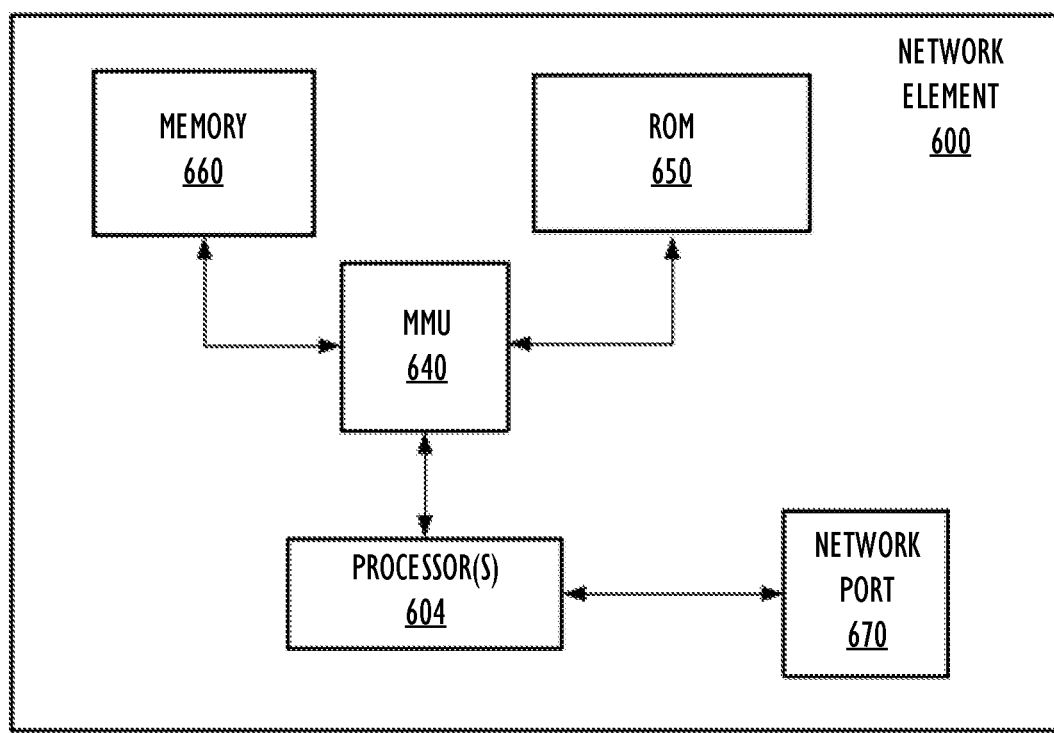
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
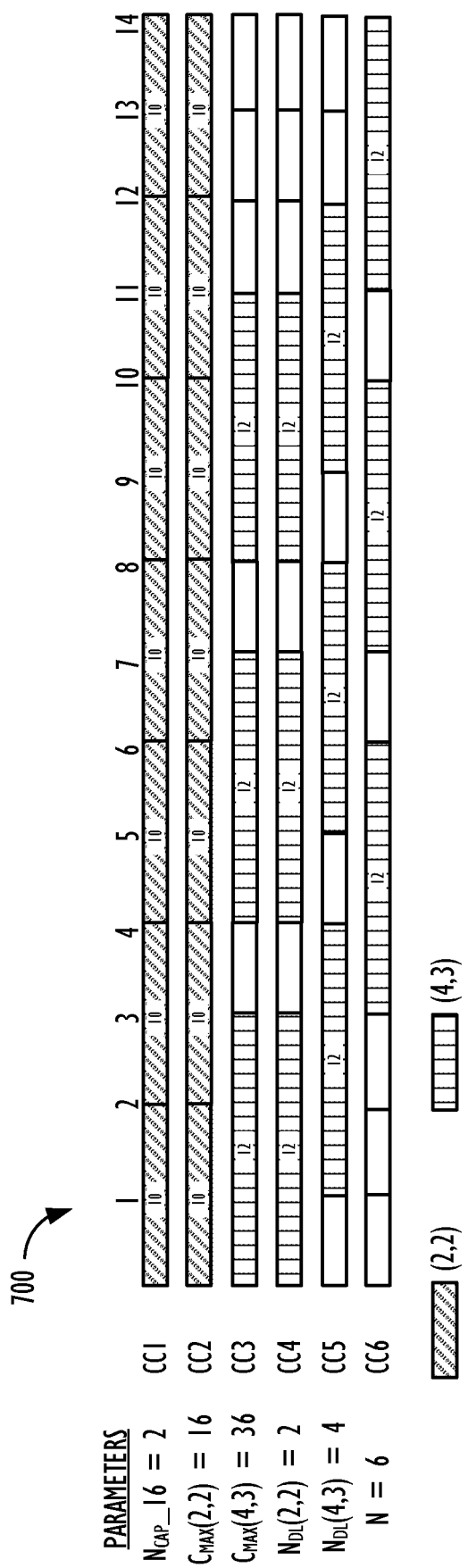
FIG. 7 illustrates an example distribution of PDCCH monitoring occasions for a set of component carriers, in accordance with aspects of the present disclosure.

Turning now to FIG. 7, an example distribution of PDCCH monitoring occasions for a set of component carriers 700 is illustrated, in accordance with aspects of the present disclosure. As shown, the set of component carriers 700 includes six component carriers, CC1-CC6, all utilizing a fixed SCS. For this example, a total number of component carriers aggregated is represented by the parameter N=6. Component carriers CC1 and CC2 utilize a (2,2) PDCCH span pattern. In this example, a number of component carriers with a (2,2) span pattern is represented by the parameter N_DL(2,2)=2. The other four component carriers CC3-CC6 utilize a (4,3) PDCCH span pattern with various starting spans. In this example, a number of component carriers with a (4,3) span pattern is represented by the parameter N_DL(4,3)=4. As shown, component carriers CC3 and CC4 both have the same span patterns and starting spans, and thus are aligned. Similarly, CC1 and CC2 are also aligned. However, as there is at least one span where not all of the spans of the component carriers have a monitoring period, the set of component carriers overall is non-aligned. In this example, the parameters C_max(2,2)=16 and C_max (4,3)=36 indicate a maximum non-overlapping CCEs per span that the UE can monitor for a given PDCCH span pattern.

In certain cases, to help reduce the PDCCH monitoring complexity, the UE may estimate the total limit for non-overlapping CCE monitoring for spans with a same span pattern and SCS and then perform a "hard split" of the number of non-overlapping CCEs required to be monitored across all of the spans, such that each component carrier is allocated a fixed number of non-overlapped CCEs per span for monitoring by sharing the limited resources equally between the component carriers. For a scheduled component carrier, the number of non-overlapped CCEs a UE may monitor on the active downlink BWP with a span configuration (X,Y) for SCS µ, of the scheduling component carrier from the downlink component carriers may be total,(X,Y)µ defined by Equation 2, min ($C_{PDCCH}^{max,(X,Y)\mu}$, $C_{PDCCH}^{total,(X,Y)\mu}/N_{cells,0}^{DL,(X,Y),\mu}$). In this example, for the component carriers with a span pattern of (2,2) using equation 1 to find a total number of non-overlapping CCEs per span to be monitored with the example parameters is $$C_{PDCCH}^{total,(2,2)} = \left\lfloor 2 \cdot 16 \cdot \frac{2}{6} \right\rfloor = 10.$$

Plugging $C_{PDCCH}^{total,(2,2)}$ into Equation 2 above, indicates that the monitoring limit for non-overlapped CCEs per span pattern span for span pattern (2,2) is Limit=min(16, 10)=10 for CC1 and CC2. Thus, UE monitoring capability for the (2,2) span pattern is split across the component carriers with the monitoring pattern. Solving Equation 1 for span pattern (4,3) can be shown as $$C_{PDCCH}^{total,(4,3)} = \left\lfloor 2 \cdot 36 \cdot \frac{4}{6} \right\rfloor = 48.$$

Plugging $C_{PDCCH}^{total,(4,3)}$ into Equation 2 above, indicates that the monitoring limit for non-overlapped CCEs per span for span pattern (4,3) is $$\text{Limit} = \min\left(36, \frac{48}{4}\right) = 12$$

for CC3-CC6. Thus, the monitoring limit for non-overlapped CCEs per span pattern span for span pattern (4,3) is 12, and UE monitoring capability for the span pattern is split across the component carriers with the span pattern. In certain cases, the above calculations may be repeated for each SCS configuration.

In certain cases, to allocate C_total between CCs in the unaligned case, assume that C(x,y) is the limit for span y within CC x, where x=1, . . . ,X, then C(x,y)=C(x) for all spans y within CC x, and the sum of all C(x,y)=C_total, for x=1, . . . ,X. In this case, the CCE values may be unevenly distributed across the component carriers but remain constant within each component carrier, and the sum of any set of spans selected across component carriers is equal to C_total.

In accordance with aspects of the present disclosure, reducing the PDCCH monitoring complexity can further be enhanced in the second scenario where the component carriers overall are non-aligned, but some of component carriers are aligned. For example, grouping may be performed into aligned and unaligned groups with the same SCS. Here, the UE may estimate the total number of non-overlapping CCEs per span to be monitored for the spans with the same configuration and SCS. Here, again, a total number of non-overlapping CCEs per span to be monitored for a given span pattern ($C_{PDCCH}^{total,(X,Y)\mu}$) is determined based on equation 1. In addition, a hard split of C_total between the different groups (e.g., aligned and non-aligned) may be performed for a given span pattern, as defined by Equation 3, $$C_{PDCCH}^{total,(X,Y),\mu,group_i} = C_{PDCCH}^{total,(X,Y),\mu} \cdot \frac{N_{cells,r16}^{DL,(X,Y),\mu,group_i}}{\sum_k N_{cells,r16}^{DL,(X,Y),\mu,k}},$$

wherein i represents an index into the number of groups in (X,Y), µ, and wherein k is an index that sums across all groups. Then, for a scheduled component carrier, the UE can monitor on the active downlink BWP with a span pattern (X,Y) for SCS µ, of the scheduling component carrier from the non-aligned downlink component carriers, a number=min($C_{PDCCH}^{max,(X,Y),\mu}$, $C_{PDCCH}^{total,(X,Y),\mu group_{non-aligned}}/N_{cells,0}^{DL,(X,Y),\mu,group_{non-aligned}}$) of non-overlapped CCEs per span. In the non-aligned case, the UE can split the maximum number of non-overlapped CCEs equally between component carriers. For aligned groups, for a scheduled component carrier, the UE can monitor on the active downlink BWP with a span configuration (X,Y) for SCS µ, of the scheduling component carrier from the non-aligned downlink component carriers, a number=min ($C_{PDCCH}^{max,(X,Y),\mu}$, $C_{PDCCH}^{total,(X,Y),\mu group_{aligned,k}}$) of non-overlapped CCEs per span. In the aligned case, the UE may allocate a component carrier, such as a Primary cell (Pcell), more non-overlapped CCEs than a secondary cell (Scell), so long as the total number does not exceed the limit. In certain cases, the above calculations may be repeated for each SCS configuration.

In certain cases, to allocate C_total between CCs in the unaligned case, assume that C(x,y) is the limit for span y within CC x, where x=1, . . . ,X, then C(x,y)=C(x) for all spans y within CC x, and the sum of all C(x,y)=C_total, for x=1, . . . ,X. In this case, the CCE values may be unevenly distributed across the component carrier groups but remain constant within each component carrier group, and the sum of any set of spans selected across component carriers is equal to C_total. Note that, within a component carrier group, the values of C(x,y) may be different.

Figure 8:
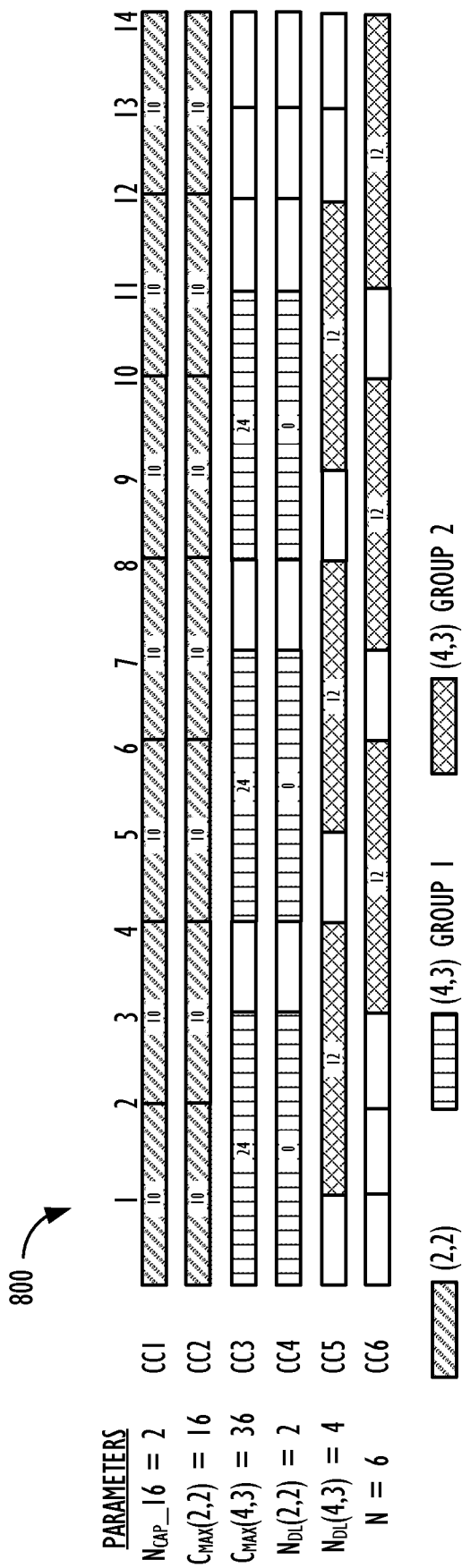
FIG. 8 illustrates an example distribution of PDCCH monitoring occasions for a set of component carriers, in accordance with aspects of the present disclosure.

FIG. 8 illustrates an example distribution of PDCCH monitoring occasions for a set of component carriers 800, in accordance with aspects of the present disclosure. As shown, the set of component carriers 800 once again includes six component carriers, CC1-CC6, all utilizing a fixed SCS with the same parameters as the example from FIG. 7. In this example the UE may split each span pattern and SCS into sets of aligned groups and a single non-aligned group and then estimate C_total for each group. This may be described by Equation 4, $$C_{PDCCH}^{total,(X,Y),\mu,group_i} = \left\lfloor N_{cells}^{cap-r16} \cdot C_{PDCCH}^{max,(X,Y),\mu} \cdot \left(N_{cells,r16}^{DL,(X,Y),\mu,group_i}\right) / \sum_{j=0}^{J} \sum_{k} \left(N_{cells,r16}^{DL,j,group_k}\right) \right\rfloor$$

In this example, the UE performs a hard split within the non-aligned groups of available monitoring occasions. For non-aligned downlink component carriers of a scheduled component carrier, the UE may monitor, on the active downlink DWP with a span pattern (X,Y) for SCS μ, a number of non-overlapped CCEs per span based on Equation 5, $\min(C_{PDCCH}^{max,(X,Y),\mu}, C_{PDCCH}^{total,(X,Y),\mu,group_{non-aligned}} / N_{cells,0}^{DL,(X,Y),\mu,group_{non-aligned}})$. For non-aligned component carriers, the UE may split the maximum number of non-overlapped CCEs equally between component carriers. For aligned span groups, the UE can pool the monitoring limits across all the spans of the aligned groups. For aligned downlink component carriers of a scheduled component carrier, the UE may monitor, on the active downlink BWP with a span pattern (X,Y) for SCS μ, a number of non-overlapped CCEs per span based on Equation 6, $\min(C_{PDCCH}^{max,(X,Y),\mu}, C_{PDCCH}^{total,(X,Y),\mu,group_{aligned,k}})$. For aligned component carriers, the UE may allocate a component carrier, such as a Pcell, more non-overlapped CCEs than a Scell, so long as the total number does not exceed the limit.

Applying the parameters of this example to solve for Equation 4 for the (2,2) span pattern of CC1 and CC2 may be shown as:

$$C_{PDCCH}^{total,(2,2)} = \left\lfloor \left(16 \cdot 2 \cdot \frac{2}{6}\right) \right\rfloor = 10.$$

As CC1 and CC2 are aligned component carriers, solving for Equation 6 may be shown as Limit=min(16,10)=10.]. Thus, the monitoring limit for non-overlapped CCEs per span pattern span for aligned component carriers having a span pattern (2,2) is 10, as shown in FIG. 8 for CC1 and CC2.

In certain cases, to allocate C_total between CCs in the unaligned case, assume that C(x,y) is the limit for span y within CC x, where x=1, . . . ,X, then C(x,y)=C(x) for all spans y within CC x, and the sum of all C(x,y)=C_total, for x=1, . . . ,X. In this case, the CCE values may be unevenly distributed across the component carrier groups but remain constant within each component carrier group, and the sum of any set of spans selected across component carriers is equal to C_total. Note that, within a component carrier group, the values of C(x,y) may be different.

In this example, CC3 and CC4 are also aligned component carriers and solving for Equation 4 may be shown as:

$$C_{PDCCH}^{total,(4,3),group_{aligned}} = \left\lfloor \left(36 \cdot 2 \cdot \frac{2}{6}\right) \right\rfloor = 24,$$

and solving for Equation 6 may be shown as Limit=min(36, 24)=24. As the UE may allocate up to all of the monitoring resources to a single component carrier of the aligned component carriers, CC3 here is allocated all 24 monitoring instances. Thus, the monitoring limit for non-overlapped CCEs per span pattern span for aligned component carriers having a span pattern (4,3) is 24, as shown in FIG. 8 for CC3 and CC4.

In this example, CC5 and CC6 are non-aligned component carriers and solving for Equation 4 may be shown as $$C_{PDCCH}^{total,(4,3),group_{non-aligned}} = \left\lfloor \left(36 \cdot 2 \cdot \frac{2}{6}\right) \right\rfloor = 24,$$

and solving for Equation 5 may be shown as $$\text{Limit} = \min\left(36, \frac{24}{2}\right) = 12.$$

Thus, the monitoring limit for non-overlapped CCEs per span pattern span for span pattern (4,3) is 12. Thus, the monitoring limit for non-overlapped CCEs per span pattern span for non-aligned component carriers having a span pattern (4,3) is 12, as shown in FIG. 8 for CC5 and CC6. In certain cases, the above calculations may be repeated for each SCS configuration. In certain cases, the determined PDCCH monitoring limit for component carriers with a shared span pattern remains constant within each component carrier. In some such cases, determining the PDCCH monitoring limit for a group of component carriers comprises determining a minimum of a predetermined maximum number of non-overlapping CCEs for a monitoring pattern and a total number of non-overlapping CCEs of the group shared by a number of component carriers with a shared span pattern.

In certain cases, "overbooking" limits, i.e., the practice of a wireless station (e.g., a gNB) configuring more non-overlapping CCEs than is allowed, based on the per-cell or carrier aggregation (CA) limits, may depend on what type of group a Pcell is located in. For example, if the Pcell is in an aligned group, then C_limit for the Pcell (C_limit(Pcell)) may be described as min(C_total_aligned, C_span), and C_limit for the corresponding Scell (C_limit(Scell)) may be described as $C_{total\_\{aligned\}}$-C_limit (Pcell). If the Pcell is in an unaligned group, then C_limit(Pcell) may equal min ($C_{total\_\{non-aligned\}}$/number(non-aligned), C_max_span). For the corresponding SCell, C_limit(Scell) may equal min ($C_{total\_\{non-aligned\}}$/number(non-aligned), C_max_span).

In accordance with aspects of the present disclosure, monitoring gap and span capability may be reported by a UE. For example, the UE may report gap and span capability to the network element by reporting a supported Ncap-r16 estimation method. As another example, a UE may receive a PDCCH configuration, the configuration indicated expected gap and span capability using the Ncap-r16 estimation method. Based on this indication, the UE may either treat all component carriers as unaligned or perform grouping as described above. In certain cases, the UE may estimate applicable gap and span configurations based on a received PDCCH configuration. The UE may also receive an Ncap-r16 estimation method, or use a stored estimation method.

In certain cases, a gNB cell may include one or more transmission and reception points (TRPs), and a UE may be configured to connect via multiple component carriers, where some component carriers are served by a single TRP, while other component carriers are served by multiple TRPs. When monitoring a component carrier operating in a multi-TRP mode, the UE may have to monitor for multiple downlink control information (DCI) from the multiple TRPs. Here, $N_{cell,0}^{DL}$ may represent a number of cells in a single DCI or single TRP mode and $N_{cell,1}^{DL}$ may represent the number of cell in a multi-DCI mode. If a UE is configured with $N_{cell,0}^{DL}+N_{cell,1}^{DL}$ downlink component carriers, for the UE to determine UE capability, PDCCH-BlindDetectionCA, the number of supported serving components carriers for PDCCH monitoring per slot is $N_{cell,0}^{DL}+\gamma \times N_{cell,1}^{DL}$, where $\gamma$ is derived from a UE capability, R. In certain cases, R may be predefined for a UE, for example, as a constant stored on the UE. With multi-TRPs, a maximum number of total PDCCH candidates and non-overlapped CCEs are scaled by r times in Rel-16, as compared to Rel-15. If the UE does not report to a network element pdcch-BlindDetectionCA, or the UE is not provided with BDFactorR, r is equal to 2. Otherwise, r is configured by BDFactorR, which is either 1 or R. For Rel-15 behavior, r=1. For r>1, the sets associated with the CORESET with CORESETPoolIndex=0 if CORESETPoolIndex is configured and on the primary cell. A CORESET is a set of physical resources, such as a downlink resource grid, and a set of parameters used to carry the PDCCH/DCI.

Where a UE is configured with $N_{cell,0}^{DL}+N_{cell,1}^{DL}$ downlink component carriers, if $$\sum_{j=0}^{3}\left(N_{cells,0}^{DL,j}+\gamma \cdot N_{cells,1}^{DL,j}\right)>4,$$

then the UE may be configured to process $C_{PSCCH}^{total,slot,\mu}$ non-overlapped CCEs per slot on the active downlink DWP of the scheduling cell, where, per Equation 7, $$C_{PDCCH}^{total,slot,\mu}=\left\lfloor N_{cells}^{cap}\cdot C_{PDCCH}^{max,slot,\mu}(N_{cells,0}^{DL,j}+\gamma\cdot N_{cells,1}^{DL,j})\cdot/\sum_{j=0}^{3}(N_{cells,0}^{DL,j}+\gamma\cdot N_{cells,1}^{DL,j})\right\rfloor$$

In such a configuration, C_total may be estimated where if a UE is configured with $$\sum_{j=0}^{1}(N_{cells,0}^{DL,(X,Y),j}+\gamma\cdot N_{cells,1}^{DL,(X,Y),j})>Z,$$

where Z is pre-defined limit, such as 4, with an associated monitoring patter (X,Y) and SCS configuration p the UE may monitor $C_{PSCCH}^{total,slot,\mu}$ non-overlapping CCEs per span on the active downlink BWP of the scheduling cells from the downlink cells. Here, per Equation 8, $$C_{PDCCH}^{total,(X,Y),\mu}=\lfloor N_{cells}^{cap-r16}\cdot C_{PDCCH}^{max,(X,Y),\mu}$$
$$(N_{cells,0}^{DL,(X,y),\mu}+\gamma\cdot N_{cells,1}^{DL,(X,Y),\mu})\cdot/\sum_{j=0}^{1}(N_{cells,0}^{DL,(X,Y),j}+\gamma\cdot N_{cells,1}^{DL,(X,Y),j})\rfloor.$$

For a scheduled cell, for the aligned component carriers, the UE may monitor, per Equation 9, $$\min(\gamma\cdot C_{PDCCH}^{max,(X,Y),\mu}\cdot C_{PDCCH}^{total,(X,Y),\mu})$$

non-overlapped CCEs per span and may monitor $$\min(C_{PDCCH}^{max,(X,Y),\mu}\cdot C_{PDCCH}^{total,(X,Y),\mu})$$

non-overlapped CCEs per span for CORESETS with the same CORESETPoolIndex value. For non-aligned component carriers, the UE may monitor, per Equation 10, $\min(\gamma\cdot C_{PDCCH}^{max,(X,Y),\mu},C_{PDCCH}^{total,(X,Y),\mu}/N_{cells,0}^{DL,(X,Y),\mu,non-aligned}+\gamma\cdot N_{cells,1}^{DL,(X,Y),\mu,non-aligned})$ non-overlapped CCEs per span and may monitor min $(C_{PDCCH}^{max,(X,Y),\mu},C_{PDCCH}^{total,(X,Y),\mu}/N_{cells,0}^{DL,(X,Y),\mu,non-aligned}+\gamma\cdot N_{cells,1}^{DL,(X,Y),\mu,non-aligned})$ non-overlapped CCEs per span for CORESETS with the same CORESETPoolIndex value. In certain cases, for any (X,Y) span pattern for a specific SCS may be treated as unaligned for a multi-TRP component carrier.

Figure 9:
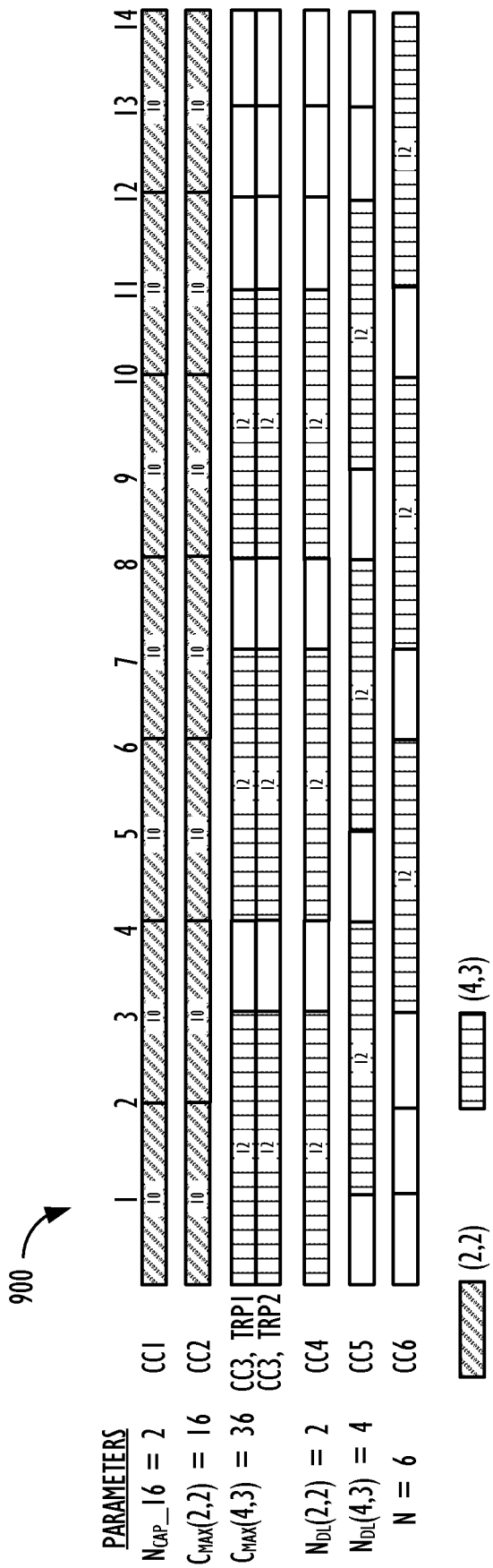
FIG. 9 illustrates an example distribution of PDCCH monitoring occasions for a set of component carriers, in accordance with aspects of the present disclosure.

FIG. 9 illustrates an example distribution of PDCCH monitoring occasions for a set of component carriers 900, in accordance with aspects of the present disclosure. In the set of component carriers 900, CC3 is configured for multi-TRP operation with TRP1 and TRP2. In this example, the parameter $\gamma=2$ and all other parameters are the same as the examples discussed with respect to FIGS. 7 and 8. Solving for Equation 8 for the (2,2) span pattern can be shown as $$C_{PDCCH}^{total,(2,2)}=\left\lfloor\left(16\cdot 2\cdot\frac{2}{7}\right)\right\rfloor=9,$$

and for the (4,3) span pattern, $$C_{PDCCH}^{total,(4,3)}=\left\lfloor\left(36\cdot 2\cdot\frac{5}{7}\right)\right\rfloor=51.$$

As the (2,2) span pattern is aligned, Equation 9 is applied as Limit=min(16, 9)=9. Thus, each (2,2) span may include 9 scheduled monitoring instances for CC1 and CC2. In this example, the (4,3) span pattern may be treated as unaligned as there is a multi-TRP component carrier with the (4,3) span pattern and Equation 10 may be applies as shown as $$\text{Limit}=\min\left(36,\frac{51}{5}\right)=11.$$

Thus, each (4,3) span may include 11 monitoring instances for CC3-CC6.

In other cases, a UE may implement certain procedures to determine whether a multi-DCI/multi-TRP configuration is aligned. This determination may be made in two steps. In the first step, the UE may define an intra-TRP alignment and an inter-TRP alignment. The intra-TRP alignment may be determined if there is a span on every downlink component carrier from the downlink component carriers which start from the symbol with a single TRP. Inter-TRP alignment may be determined if there is a span on every other TRP from all the TRPs that starts from the symbol within a single downlink component carrier, and the UE can process the PDCCHs from the different TRPs substantially simultaneously, e.g., where the difference in the timing advance to the two TRPs is less than a threshold, such as a threshold processing limit. This threshold may be defined as a UE capability or otherwise predefined.

In the second step, the UE may classify a transmission as aligned or non-aligned based on the intra-TRP or inter-TRP alignment. This classification may be based on four scenarios. The first is where there is intra-TRP alignment and inter-TRP alignment. In such case, the UE may classification the transmission as aligned. In this scenario, a single group may be used to estimate C_total, based on the aligned span technique described above. In the second scenario, there may be an intra-TRP alignment, but inter-TRP is non-aligned. In this scenario, the UE may create two groups, the first group including intra-TRP component carriers without multi-DCI mode which are aligned, and a second group including intra-TRP component carriers with multi-DCI mode, which are non-aligned. Alternatively, in this second scenario, the UE may assume R=1 and fall back to basic Rel-15 behavior, i.e., PDCCH monitoring based on a single TRP and its associated limits. In the third scenario, intra-TRP may be non-aligned with inter-TRP alignment. In this scenario, the system may be considered non-aligned with R set to the configured value. In a fourth scenario, intra-TRP may be non-aligned and inter-TRP may also be non-aligned. In this scenario, the UE may assume R=1 and fall back to basic Rel-15 limits.

Figure 10:
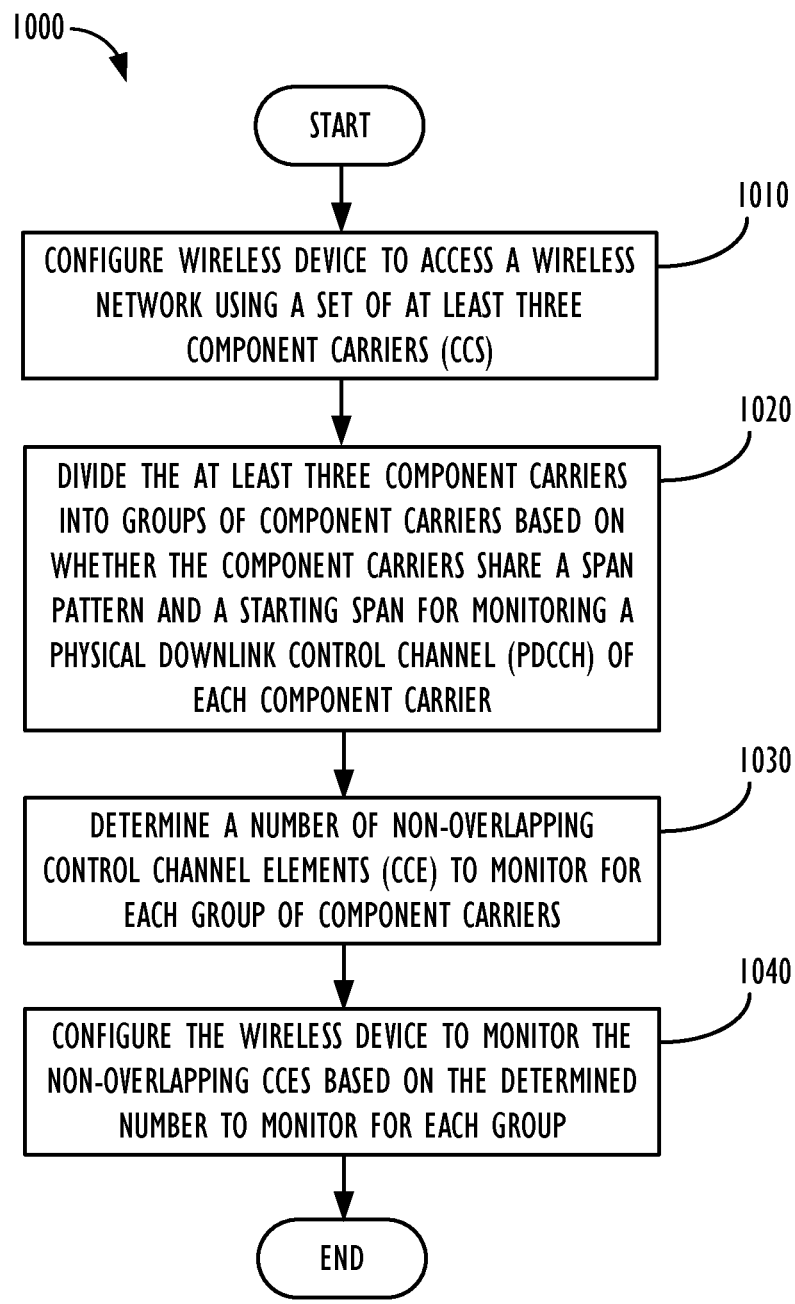
FIG. 10 illustrates a technique for wireless communications, in accordance with aspects of the present disclosure.

FIG. 10 illustrates a technique for wireless communications 1000, in accordance with aspects of the present disclosure. At block 1010, a wireless device is configured to access a wireless network using a set of at least three component carriers (CCs). At block 1020, the at least three CCs are divided into groups of CCs based on whether the CCs share a monitoring pattern and a starting span for monitoring a Physical Downlink Control Channel (PDCCH) of each CC. At block 1030, a number of non-overlapping control channel elements (CCE) are determined to monitor for each group of CCs. At block 1040, the wireless device is configured to monitor the non-overlapping CCEs based on the determined number to monitor for each group. In certain cases, the dividing is further based on subcarrier spacings of the CCs.

Figure 11:
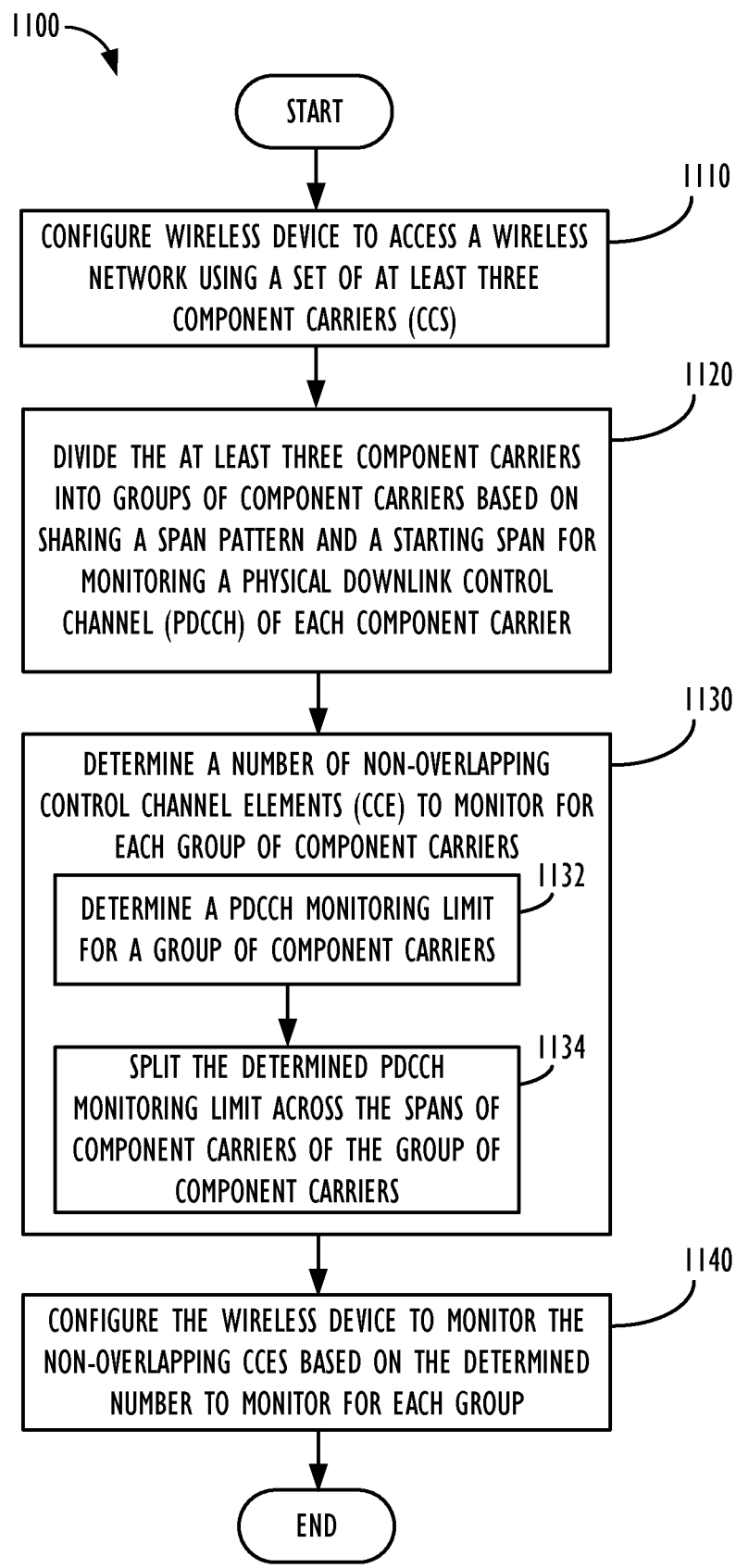
FIG. 11 illustrates a technique for wireless communications, in accordance with aspects of the present disclosure.

FIG. 11 illustrates a technique for wireless communications 1100, in accordance with aspects of the present disclosure. At block 1110, a wireless device is configured to access a wireless network using a set of at least three CCs. At block 1120, the at least three CCs are divided into groups of CCs based on whether the CCs share a monitoring pattern and a starting span for monitoring a PDCCH of each CC. At block 1130, a number of non-overlapping CCEs are determined to monitor for each group of CCs. At block 1132, a PDCCH monitoring limit for a group of component carriers is determined. At block 1134, the determined PDCCH monitoring limit is split across the spans of the component carriers of the group of component carriers. At block 1140, the wireless device is configured to monitor the non-overlapping CCEs based on the determined number to monitor for each group.

Figure 12:
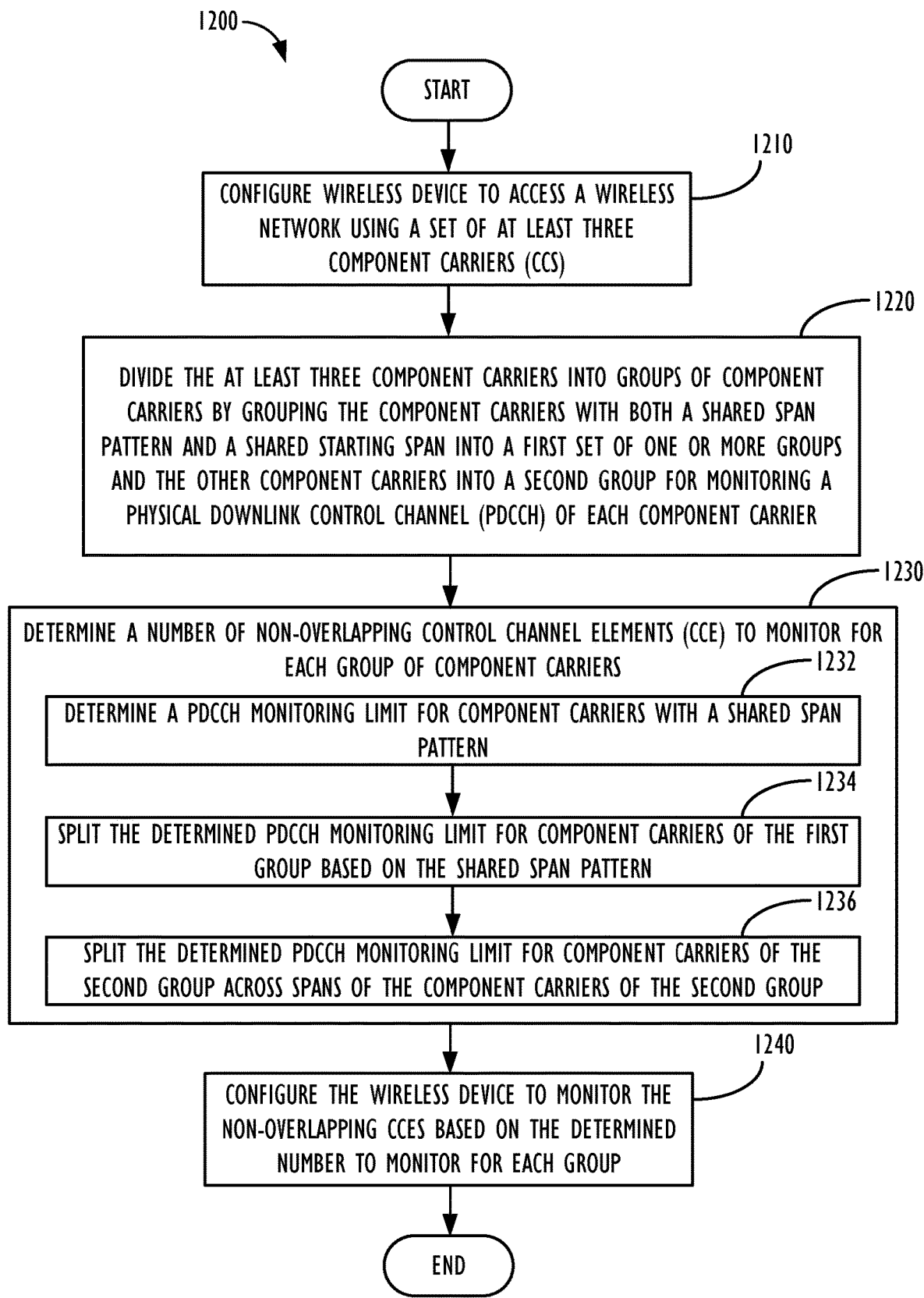
FIG. 12 illustrates a technique for wireless communications, in accordance with aspects of the present disclosure.

FIG. 12 illustrates a technique for wireless communications 1200, in accordance with aspects of the present disclosure. At block 1210, a wireless device is configured to access a wireless network using a set of at least three CCs. At block 1220, the at least three CCs are divided into groups of CCs by grouping the component carriers with both a shared span pattern and a shared starting span into a first set of one or more groups and the other component carriers into a second group for monitoring a PDCCH of each CC. At block 1230, a number of non-overlapping CCEs are determined to monitor for each group of CCs. At block 1232, a PDCCH monitoring limit is determined for component carriers with a shared span pattern. At block 1234, the determined PDCCH monitoring limit is split for component carriers of the first group based on the shared span pattern. At block 1236 the determined PDCCH monitoring limit is split for component carriers of the second group across spans of the component carriers of the second group. At block 1240, the wireless device is configured to monitor the non-overlapping CCEs based on the determined number to monitor for each group.

Figure 13:
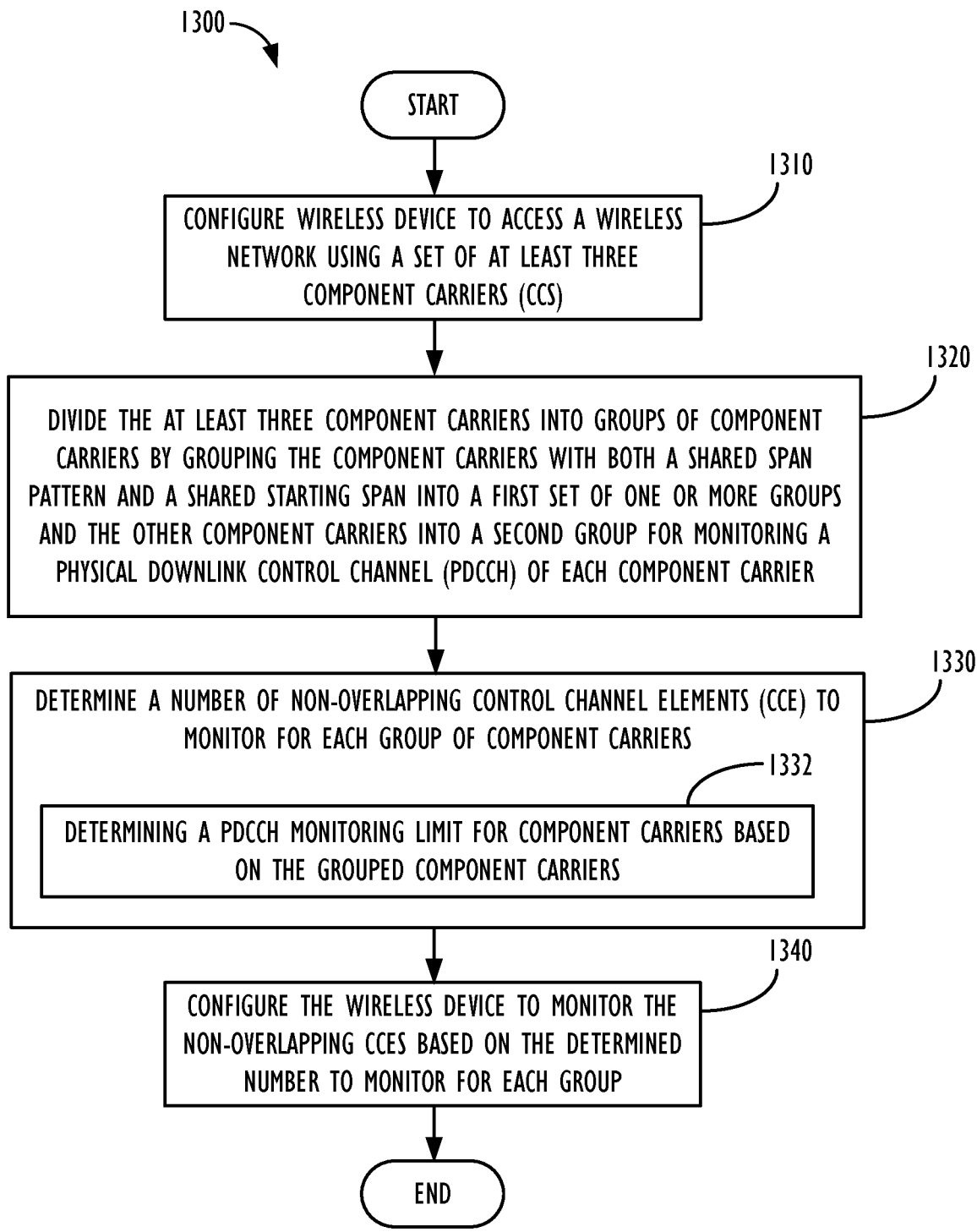
FIG. 13 illustrates a technique for wireless communications, in accordance with aspects of the present disclosure.

FIG. 13 illustrates a technique for wireless communications 1300, in accordance with aspects of the present disclosure. At block 1310, a wireless device is configured to access a wireless network using a set of at least three CCs. At block 1320, the at least three CCs are divided into groups of CCs by grouping the component carriers with both a shared span pattern and a shared starting span into a first set of one or more groups and the other component carriers into a second group for monitoring a PDCCH of each CC. At block 1330, a number of non-overlapping CCEs are determined to monitor for each group of CCs. At block 1332, a PDDCH monitoring limit for component carriers is determined based on the grouped component carriers. At block 1340, the wireless device is configured to monitor the non-overlapping CCEs based on the determined number to monitor for each group.

Figure 14:
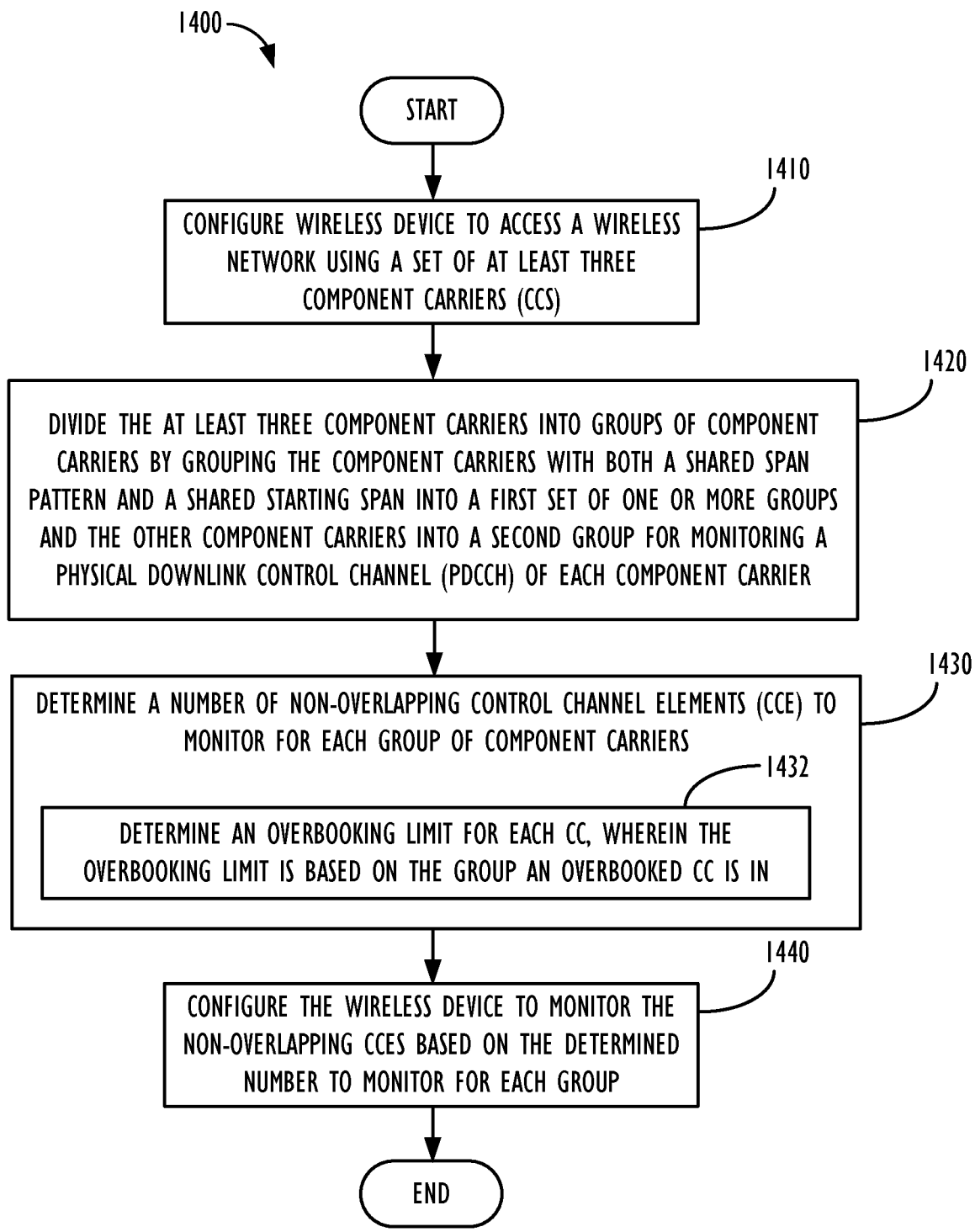
FIG. 14 illustrates a technique for wireless communications, in accordance with aspects of the present disclosure.

FIG. 14 illustrates a technique for wireless communications 1400, in accordance with aspects of the present disclosure. At block 1410, a wireless device is configured to access a wireless network using a set of at least three CCs. At block 1420, the at least three CCs are divided into groups of CCs by grouping the component carriers with both a shared span pattern and a shared starting span into a first set of one or more groups and the other component carriers into a second group for monitoring PDCCH of each CC. At block 1430, a number of non-overlapping CCEs are determined to monitor for each group of CCs. At block 1432, an overbooking limit is determined for each CC, wherein the overbooking limit is based on the group an overbooked CC is in. At block 1440, the wireless device is configured to monitor the non-overlapping CCEs based on the determined number to monitor for each group.

Figure 15:
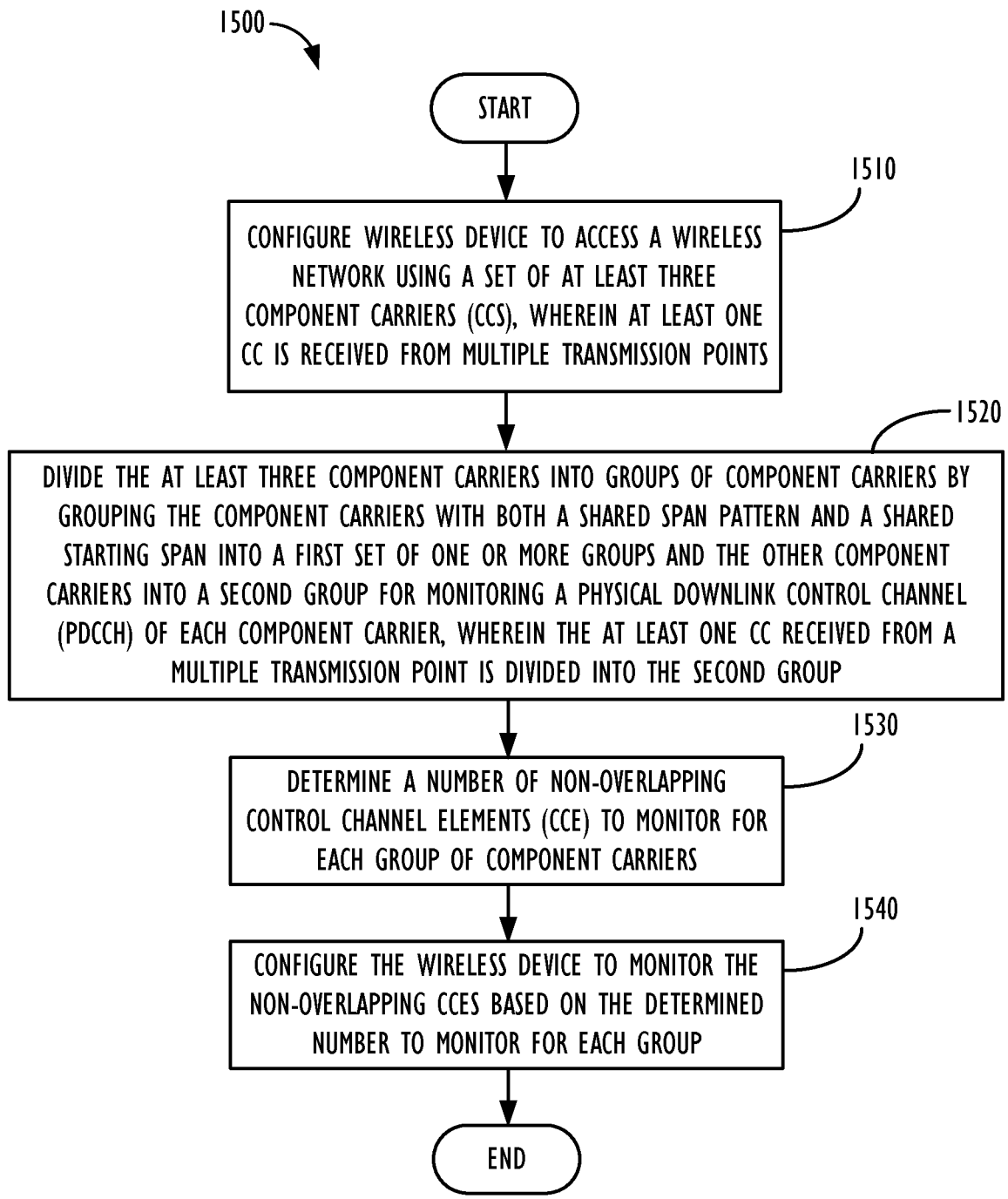
FIG. 15 illustrates a technique for wireless communications, in accordance with aspects of the present disclosure.

FIG. 15 illustrates a technique for or wireless communications 1500, in accordance with aspects of the present disclosure. At block 1510, a wireless device is configured to access a wireless network using a set of at least three CCs, where at least one of the CCs is received from multiple transmission points. At block 1520, the at least three CCs are divided into groups of CCs by grouping the component carriers with both a shared span pattern and a shared starting span into a first set of one or more groups and the other component carriers into a second group for monitoring a PDCCH of each CC, wherein the at least one CC received from a multiple transmission point is divided into the second group. At block 1530, a number of non-overlapping CCEs are determined to monitor for each group of CCs. At block 1540, the wireless device is configured to monitor the non-overlapping CCEs based on the determined number to monitor for each group.

Figure 16:
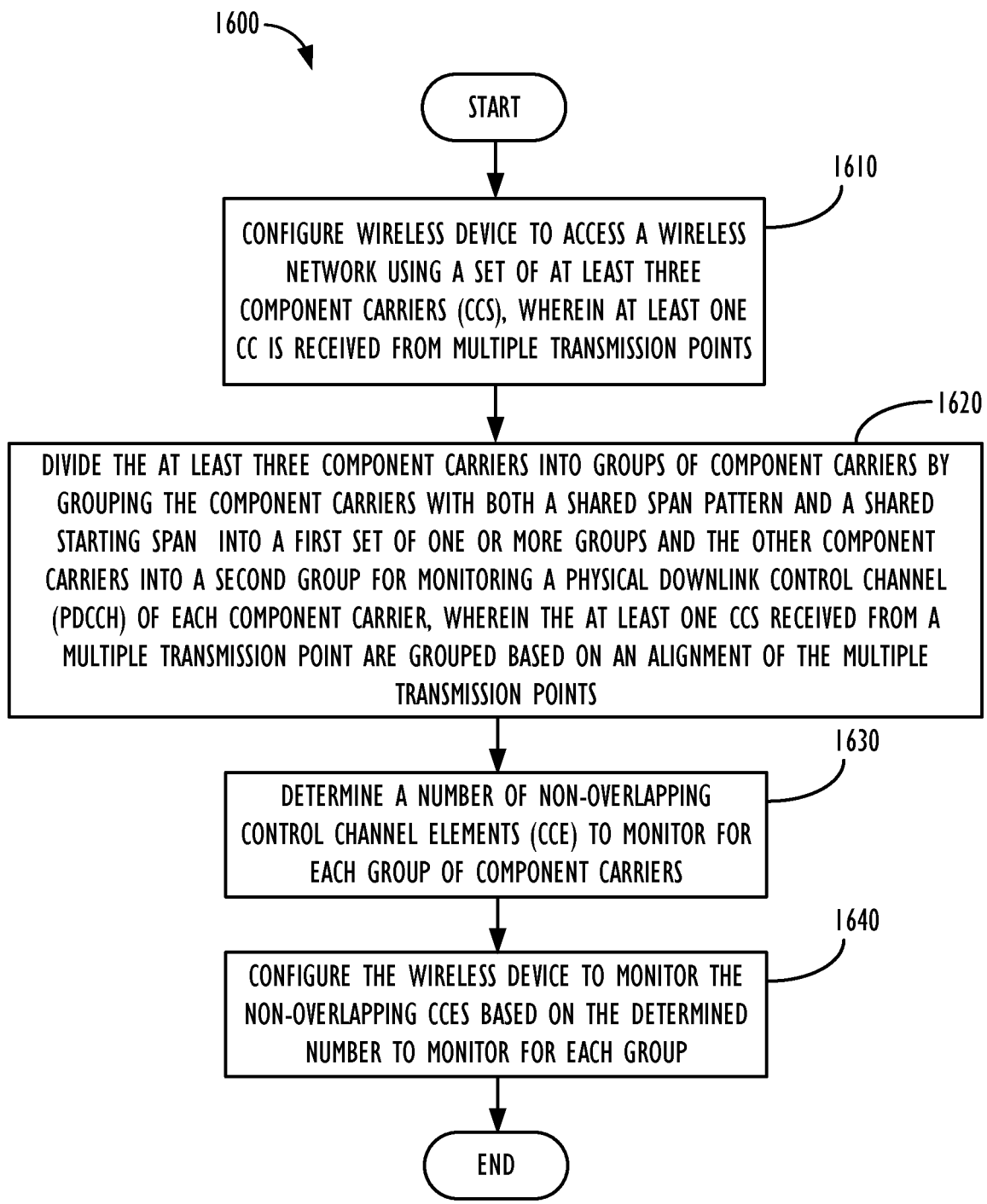
FIG. 16 illustrates a technique for wireless communications, in accordance with aspects of the present disclosure.

FIG. 16 illustrates a technique for wireless communications 1400, in accordance with aspects of the present disclosure. At block 1510, a wireless device is configured to access a wireless network using a set of at least CCs, where at least one of the CCs is received from multiple transmission points. At block 1520, the at least three CCs are divided into groups of CCs by grouping the component carriers with both a shared span pattern and a shared starting span into a first set of one or more groups and the other component carriers into a second group for monitoring a PDCCH of each CC, wherein the at least one of the CCs received from a multiple transmission point are grouped based on an alignment of the multiple transmission points. At block 1630, a number of non-overlapping CCEs are determined to monitor for each group of CCs. At block 1640, the wireless device is configured to monitor the non-overlapping CCEs based on the determined number to monitor for each group.

It is noted that, while the examples and embodiments above focus primarily on methods to calculate the maximum number of non-overlapping CCEs in a carrier aggregation scenario, similar methodologies and formulae may also be applied for calculating the maximum number of PDCCH Candidates (i.e., M) in a wireless communication scenario. Similarly, while the examples and embodiments above focus primarily methods to calculate the maximum number of non-overlapping CCEs in a carrier aggregation scenario, similar methodologies and formulae may also be applied for calculating limits on the number of blind decodes (BDs) that may be attempted by a UE in a carrier aggregation scenario, as well.

EXAMPLES

In the following sections, further exemplary embodiments are provided.

According to Example 1, a method is disclosed, comprising: configuring a wireless device to access a wireless network using a set of at least three components carriers (CCs); dividing the at least three component carriers into groups of component carriers based on whether the component carriers share a span pattern and a starting span for monitoring a Physical Downlink Control Channel (PDCCH) of each component carrier; determining a number of non-overlapping control channel elements (CCE) to monitor for each group of component carriers; and configuring the wireless device to monitor the non-overlapping CCEs based on the determined number to monitor for each group.

Example 2 comprises the subject matter of Example 1, wherein the dividing is further based on subcarrier spacing of the component carriers.

Example 3 comprises the subject matter of Example 1, wherein the determined number of non-overlapping CCEs to monitor is a predetermined number.

Example 4 comprises the subject matter of Example 1, wherein the dividing comprises grouping the component carriers based on a shared span pattern; and wherein determining the number of non-overlapping CCEs to monitor comprises: determining a PDCCH monitoring limit for a group of component carriers, and splitting the determined PDCCH monitoring limit across spans of the component carriers of the group of component carriers.

Example 5 comprises the subject matter of Example 1, wherein the dividing comprises grouping the component carriers with both a shared monitoring pattern and a shared starting span into a first set of one or more groups and the other component carriers into a second group; and wherein determining the number of non-overlapping CCEs to monitor for the second group comprises: determining a PDCCH monitoring limit for component carriers with a shared span pattern, splitting the determined PDCCH monitoring limit for component carriers of the first group based on the shared span pattern; and splitting the determined PDCCH monitoring limit for component carriers of the second group across spans of the component carriers of the second group.

Example 6 comprises the subject matter of Example 5, wherein determining a PDCCH monitoring limit for component carriers of the second group comprises determining a minimum of a predetermined maximum number of spans for a monitoring pattern and a total number of component carriers of the second group divided by a number of component carriers with a shared span pattern.

Example 7 comprises the subject matter of Example 6, wherein the determined PDCCH monitoring limit for component carriers with a shared span pattern remains constant within each component carrier.

Example 8 comprises the subject matter of Example 5, wherein determining a PDCCH monitoring limit for component carriers of the second group comprises determining a minimum of a predetermined maximum number of non-overlapping CCEs for a monitoring pattern and a total number of non-overlapping CCEs of the second group shared by a number of component carriers with a shared span pattern.

Example 9 comprises the subject matter of Example 8, wherein the determined PDCCH monitoring limit for component carriers with a shared span pattern remains constant within each component carrier.

Example 10 comprises the subject matter of Example 1, wherein the dividing comprises grouping the component carriers with both a shared monitoring pattern and a shared starting span into a first set of one or more groups and the other component carriers into a second group; and wherein determining the number of non-overlapping CCEs to monitor comprises: determining a PDCCH monitoring limit for component carriers based on the grouped component carriers.

Example 11 comprises the subject matter of Example 1, wherein the dividing comprises grouping the component carriers with both a shared monitoring pattern and a shared starting span into a first set of one or more groups and the other component carriers into a second group; and wherein an overbooking limit is based on the group an overbooked CC is in.

Example 12 comprises the subject matter of Example 1, further comprising transmitting the determined non-overlapping CCE to monitor to a wireless station.

Example 13 comprises the subject matter of Example 1, wherein the determined non-overlapping CCE to monitor is based on configuration information received from the wireless station.

Example 14 comprises the subject matter of Example 1, wherein at least one CC of the set of CCs is received from multiple transmission points.

Example 15 comprises the subject matter of Example 14, wherein the dividing comprises grouping the component carriers with both a shared monitoring pattern and a shared starting span into a first set of one or more groups and the other component carriers into a second group, and wherein the at least one CC received from multiple transmission point is divided into the second group.

Example 16 comprises the subject matter of Example 14, further comprising grouping CCs received from multiple transmission points based on an alignment of the multiple transmission points.

According to Example 17, a wireless device is disclosed, comprising: an antenna; a radio operably coupled to the antenna; and a processor operably coupled to the radio; wherein the wireless device is configured to: access a wireless network using at least three components carriers (CCs); divide the at least three component carriers into groups of component carriers based on whether the component carriers share a monitoring pattern for monitoring a Physical Downlink Control Channel (PDCCH) of each component carrier; determine a number of non-overlapping control channel elements (CCE) to monitor for each group of component carriers; and monitor the non-overlapping CCEs based on the determined number to monitor for each group.

Example 18 comprises the subject matter of Example 17, wherein the wireless device is configured to divide the at least three component carriers by grouping the component carriers based on a shared span pattern; and wherein determining the number of non-overlapping CCEs to monitor comprises: determining a PDCCH monitoring limit for a group of component carriers, and splitting the determined PDCCH monitoring limit across spans of the component carriers of the group of component carriers.

Example 19 comprises the subject matter of Example 17, wherein the wireless device is configured to divide the at least three component carriers by grouping the component carriers with both a shared monitoring pattern and a shared starting span into a first set of one or more groups and the other component carriers into a second group; and wherein the wireless device is configured to determine the number of non-overlapping CCEs to monitor for the second group by: determining a PDCCH monitoring limit for component carriers with a shared span pattern, splitting the determined PDCCH monitoring limit for component carriers of the first group based on the shared span pattern; and splitting the determined PDCCH monitoring limit for component carriers of the second group across spans of the component carriers of the second group.

Example 20 comprises the subject matter of Example 17, wherein the wireless device is configured to divide the at least three component carriers by grouping the component carriers with both a shared monitoring pattern and a shared starting span into a first set of one or more groups and the other component carriers into a second group; and wherein the wireless device is configured to determine the number of non-overlapping CCEs to monitor by: determining a PDCCH monitoring limit for component carriers based on the grouped component carriers.

Example 21 comprises the subject matter of Example 17, wherein the wireless device is configured to divide the at least three component carriers by grouping the component carriers with both a shared monitoring pattern and a shared starting span into a first set of one or more groups and the other component carriers into a second group; and wherein an overbooking limit is based on the group an overbooked CC is in.

Example 22 comprises the subject matter of Example 17, wherein at least one CC of the set of CCs is received from multiple transmission points.

According to Example 23 an apparatus is disclosed, comprising: a processor configured to: configure a wireless device to access a wireless network using at least three components carriers (CCs); divide the at least three component carriers into groups of component carriers based on whether the component carriers share a monitoring pattern for monitoring a Physical Downlink Control Channel (PDCCH) of each component carrier; determine a number of non-overlapping control channel elements (CCE) to monitor for each group of component carriers; and configuring the wireless device to monitor the non-overlapping CCEs based on the determined number to monitor for each group.

Example 24 comprises the subject matter of Example 23, wherein the processor is further configured to divide the at least three component carriers by grouping the component carriers based on a shared span pattern; and wherein determining the number of non-overlapping CCEs to monitor comprises: determining a PDCCH monitoring limit for a group of component carriers, and splitting the determined PDCCH monitoring limit across spans of the component carriers of the group of component carriers.

Example 25 comprises the subject matter of Example 23, wherein the processor is further configured to divide the at least three component carriers by grouping the component carriers with both a shared monitoring pattern and a shared starting span into a first set of one or more groups and the other component carriers into a second group; and wherein the processor is further configured to configure the wireless device to determine the number of non-overlapping CCEs to monitor for the second group by: determining a PDCCH monitoring limit for component carriers with a shared span pattern, splitting the determined PDCCH monitoring limit for component carriers of the first group based on the shared span pattern; and splitting the determined PDCCH monitoring limit for component carriers of the second group across spans of the component carriers of the second group.

Example 26 comprises the subject matter of Example 23, wherein the processor is further configured to divide the at least three component carriers by grouping the component carriers with both a shared monitoring pattern and a shared starting span into a first set of one or more groups and the other component carriers into a second group; and wherein the processor is further configured to configure the wireless device to determine the number of non-overlapping CCE to monitor by: determining a PDCCH monitoring limit for component carriers based on the grouped component carriers.

Example 27 comprises the subject matter of Example 23, wherein the processor is further configured to divide the at least three component carriers by grouping the component carriers with both a shared monitoring pattern and a shared starting span into a first set of one or more groups and the other component carriers into a second group; and wherein an overbooking limit is based on the group an overbooked CC is in.

Example 28 comprises the subject matter of Example 23, wherein the apparatus is configured to transmit at least one CC of the set of CCs from multiple transmission points.

Example 29 comprises a method that includes any action or combination of actions as substantially described herein in the Detailed Description.

Example 30 comprises a method as substantially described herein with reference to each or any combination of the Figures included herein or with reference to each or any combination of paragraphs in the Detailed Description.

Example 31 comprises a wireless device configured to perform any action or combination of actions as substantially described herein in the Detailed Description as included in the wireless device.

Example 32 comprises a wireless station configured to perform any action or combination of actions as substantially described herein in the Detailed Description as included in the wireless station.

Example 33 comprises a non-volatile computer-readable medium that stores instructions that, when executed, cause the performance of any action or combination of actions as substantially described herein in the Detailed Description.

Example 34 comprises an integrated circuit configured to perform any action or combination of actions as substantially described herein in the Detailed Description.

Example 35 comprises the subject matter of Example 17, wherein the dividing is further based on subcarrier spacing of the component carriers.

Example 36 comprises the subject matter of Example 17, wherein the determined number of non-overlapping CCEs to monitor is a predetermined number.

Example 37 comprises the subject matter of Example 19, wherein determining a PDCCH monitoring limit for component carriers of the second group comprises determining a minimum of a predetermined maximum number of spans for a monitoring pattern and a total number of component carriers of the second group divided by a number of component carriers with a shared span pattern.

Example 38 comprises the subject matter of Example 37, wherein the determined PDCCH monitoring limit for component carriers with a shared span pattern remains constant within each component carrier.

Example 39 comprises the subject matter of Example 37, wherein determining a PDCCH monitoring limit for component carriers of the second group comprises determining a minimum of a predetermined maximum number of non-overlapping CCEs for a monitoring pattern and a total number of non-overlapping CCEs of the second group shared by a number of component carriers with a shared span pattern.

Example 40 comprises the subject matter of Example 39, wherein the determined PDCCH monitoring limit for component carriers with a shared span pattern remains constant within each component carrier.

Example 41 comprises the subject matter of Example 17, wherein the wireless device is further configured to transmit the determined non-overlapping CCE to monitor to a wireless station.

Example 42 comprises the subject matter of Example 17, wherein the determined non-overlapping CCE to monitor is based on configuration information received from the wireless station.

Example 43 comprises the subject matter of Example 22, wherein the wireless device is further configured to divide the at least three component carriers by grouping the component carriers with both a shared monitoring pattern and a shared starting span into a first set of one or more groups and the other component carriers into a second group, and wherein the at least one CC received from multiple transmission point is divided into the second group.

Example 44 comprises the subject matter of Example 22, wherein the wireless device is further configured to group CCs received from multiple transmission points based on an alignment of the multiple transmission points.

Example 45 comprises the subject matter of Example 23, wherein the dividing is further based on subcarrier spacing of the component carriers.

Example 46 comprises the subject matter of Example 23, wherein the determined number of non-overlapping CCEs to monitor is a predetermined number.

Example 47 comprises the subject matter of Example 25, wherein determining a PDCCH monitoring limit for component carriers of the second group comprises determining a minimum of a predetermined maximum number of spans for a monitoring pattern and a total number of component carriers of the second group divided by a number of component carriers with a shared span pattern.

Example 48 comprises the subject matter of Example 23, wherein the wireless device is further configured to transmit the determined non-overlapping CCE to monitor to a wireless station.

Example 49 comprises the subject matter of Example 23, wherein the determined non-overlapping CCE to monitor is based on configuration information received from the wireless station.

Example 50 comprises the subject matter of Example 28, wherein the wireless device is further configured to divide the at least three component carriers by grouping the component carriers with both a shared monitoring pattern and a shared starting span into a first set of one or more groups and the other component carriers into a second group, and wherein the at least one CC received from multiple transmission point is divided into the second group.

Example 51 comprises the subject matter of Example 28, wherein the wireless device is further configured to group CCs received from multiple transmission points based on an alignment of the multiple transmission points.

According to Example 52, a method is disclosed, comprising: configuring a wireless device to access a wireless network using a set of components carriers (CCs); dividing the set of CCs into groups of component carriers based on whether the component carriers share a span pattern and a starting span for monitoring a Physical Downlink Control Channel (PDCCH) of each component carrier; determining a number of non-overlapping control channel elements (CCE) to monitor for each group of component carriers; and configuring the wireless device to monitor the non-overlapping CCEs based on the determined number to monitor for each group.

Example 53 comprises the subject matter of Example 49, wherein the set of CCs includes at least three CCs.

According to Example 54, a wireless device is disclosed, comprising: an antenna; a radio operably coupled to the antenna; and a processor operably coupled to the radio; wherein the wireless device is configured to: access a wireless network using a set of components carriers (CCs); divide the set of CCs into groups of CCs based on whether the CCs share a monitoring pattern for monitoring a Physical Downlink Control Channel (PDCCH) of each component carrier; determine a number of non-overlapping control channel elements (CCE) to monitor for each group of component carriers; and monitor the non-overlapping CCEs based on the determined number to monitor for each group.

Example 55 comprises the subject matter of Example 51, wherein the set of CCs includes at least three CCs.

According to Example 56 an apparatus is disclosed, comprising: a processor configured to: configure a wireless device to access a wireless network using a set of components carriers (CCs); divide the set of CCs into groups of CCs based on whether the CCs share a monitoring pattern for monitoring a Physical Downlink Control Channel (PDCCH) of each CC; determine a number of non-overlapping control channel elements (CCE) to monitor for each group of CCs; and configuring the wireless device to monitor the non-overlapping CCEs based on the determined number to monitor for each group.

Example 57 comprises the subject matter of Example 52, wherein the set of CCs includes at least three CCs.

Yet another exemplary embodiment may include a method, comprising, by a device, performing any or all parts of the preceding Examples.

A yet further exemplary embodiment may include a non-transitory computer-accessible memory medium comprising program instructions which, when executed at a device, cause the device to implement any or all parts of any of the preceding Examples.

A still further exemplary embodiment may include a computer program comprising instructions for performing any or all parts of any of the preceding Examples.

Yet another exemplary embodiment may include an apparatus comprising means for performing any or all of the elements of any of the preceding Examples.

Still another exemplary embodiment may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for wireless communications, comprising:
   configuring a wireless device to access a wireless network using a set of components carriers (CCs);
   dividing the set of component carriers into groups of component carriers based on whether the component carriers share a span pattern and a starting span for monitoring a Physical Downlink Control Channel (PDCCH) of each component carrier;
   determining a number of non-overlapping control channel elements (CCE) to monitor for each group of component carriers; and
   configuring the wireless device to monitor the non-overlapping CCEs based on the determined number to monitor for each group.

2. The method of claim 1, wherein the dividing is further based on subcarrier spacing of the component carriers.

3. The method of claim 1, wherein the determined number of non-overlapping CCEs to monitor is a predetermined number.

4. The method of claim 1, wherein the dividing comprises grouping the component carriers based on a shared span pattern; and
   wherein determining the number of non-overlapping CCEs to monitor comprises:
      determining a PDCCH monitoring limit for a group of component carriers, and
      splitting the determined PDCCH monitoring limit across spans of the component carriers of the group of component carriers.

5. The method of claim 1, wherein the dividing comprises grouping the component carriers with both a shared monitoring pattern and a shared starting span into a first set of one or more groups and the other component carriers into a second group; and
   wherein determining the number of non-overlapping CCEs to monitor for the second group comprises:
      determining a PDCCH monitoring limit for component carriers with a shared span pattern,
      splitting the determined PDCCH monitoring limit for component carriers of the first group based on the shared span pattern; and
      splitting the determined PDCCH monitoring limit for component carriers of the second group across spans of the component carriers of the second group.

6. The method of claim 5, wherein determining a PDCCH monitoring limit for component carriers of the second group comprises determining a minimum of a predetermined maximum number of non-overlapping CCEs for a monitoring pattern and a total number of non-overlapping CCEs of the second group divided by a number of component carriers with a shared span pattern.

7. The method of claim 5, wherein the determined PDCCH monitoring limit for component carriers with a shared span pattern remains constant within each component carrier.

8. The method of claim 1, wherein determining a PDCCH monitoring limit for component carriers of the second group comprises determining a minimum of a predetermined maximum number of non-overlapping CCEs for a monitoring pattern and a total number of non-overlapping CCEs of the second group shared by a number of component carriers with a shared span pattern.

9. The method of claim 1, wherein the dividing comprises grouping the component carriers with both a shared monitoring pattern and a shared starting span into a first set of one or more groups and the other component carriers into a second group; and
   wherein determining the number of non-overlapping CCEs to monitor comprises:
      determining a PDCCH monitoring limit for component carriers based on the grouped component carriers.

10. The method of claim 1, wherein the dividing comprises grouping the component carriers with both a shared monitoring pattern and a shared starting span into a first set of one or more groups and the other component carriers into a second group; and
   wherein an overbooking limit is based on the group an overbooked CC is in.

11. The method of claim 1, further comprising transmitting the determined number of non-overlapping CCE to monitor to a wireless station.

12. The method of claim 11, wherein the determined number of non-overlapping CCE to monitor is based on configuration information received from the wireless station.

13. The method of claim 1, wherein at least one CC of the set of CCs is received from multiple transmission points.

14. The method of claim 13, wherein the dividing comprises grouping the component carriers with both a shared monitoring pattern and a shared starting span into a first set of one or more groups and the other component carriers into a second group, and wherein the at least one CC received from multiple transmission point is divided into the second group.

15. The method of claim 13, further comprising grouping CCs received from multiple transmission points based on an alignment of the multiple transmission points.

16. A wireless device comprising:
an antenna;
a radio operably coupled to the antenna; and
a processor operably coupled to the radio;
wherein the wireless device is configured to:
  access a wireless network using a set of components carriers (CCs);
  divide the set of component carriers into groups of component carriers based on whether the component carriers share a monitoring pattern for monitoring a Physical Downlink Control Channel (PDCCH) of each component carrier;
  determine a number of non-overlapping control channel elements (CCE) to monitor for each group of component carriers; and
  monitor the non-overlapping CCEs based on the determined number to monitor for each group.

17. The wireless device of claim 16, wherein the wireless device is configured to divide the set of component carriers by grouping the component carriers based on a shared span pattern; and
wherein determining the number of non-overlapping CCEs to monitor comprises:
  determining a PDCCH monitoring limit for a group of component carriers, and
  splitting the determined PDCCH monitoring limit across spans of the component carriers of the group of component carriers.

18. The wireless device of claim 16, wherein the wireless device is configured to divide the set of component carriers by grouping the component carriers with both a shared monitoring pattern and a shared starting span into a first set of one or more groups and the other component carriers into a second group; and
wherein the wireless device is configured to determine the number of non-overlapping CCEs to monitor for the second group by:
  determining a PDCCH monitoring limit for component carriers with a shared span pattern,
  splitting the determined PDCCH monitoring limit for component carriers of the first group based on the shared span pattern; and
  splitting the determined PDCCH monitoring limit for component carriers of the second group across spans of the component carriers of the second group.

19. An apparatus, comprising:
a processor configured to:
  configure a wireless device to access a wireless network using a set of components carriers (CCs);
  divide the set of component carriers into groups of component carriers based on whether the component carriers share a monitoring pattern for monitoring a Physical Downlink Control Channel (PDCCH) of each component carrier;
  determine a number of non-overlapping control channel elements (CCE) to monitor for each group of component carriers; and
  configuring the wireless device to monitor the non-overlapping CCEs based on the determined number to monitor for each group.

20. The apparatus of claim 19, wherein the processor is further configured to divide the set of component carriers by grouping the component carriers based on a shared span pattern; and
wherein determining the number of non-overlapping CCEs to monitor comprises:
  determining a PDCCH monitoring limit for a group of component carriers, and
  splitting the determined PDCCH monitoring limit across spans of the component carriers of the group of component carriers.

* * * * *